(12) United States Patent
Kawakubo et al.

(10) Patent No.: US 7,557,461 B2
(45) Date of Patent: Jul. 7, 2009

(54) POWER SUPPLY DEVICE AND POWER SUPPLY METHOD

(75) Inventors: Yosuke Kawakubo, Odawara (JP); Tetsuya Inoue, Odawara (JP); Masahiro Sone, Numadu (JP); Hiroshi Suzuki, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 223 days.

(21) Appl. No.: 11/396,638

(22) Filed: Apr. 4, 2006

(65) Prior Publication Data
US 2007/0205664 A1 Sep. 6, 2007

(30) Foreign Application Priority Data
Mar. 1, 2006 (JP) ............................. 2006-055413

(51) Int. Cl.
*H02J 1/10* (2006.01)
*H02J 9/00* (2006.01)
(52) U.S. Cl. ............................. 307/29; 307/18; 307/23; 307/51; 307/80; 307/130
(58) Field of Classification Search .................. 307/23, 307/29, 51, 80, 130, 18; 700/293; 713/330
See application file for complete search history.

(56) References Cited

U.S. PATENT DOCUMENTS

| | | | | |
|---|---|---|---|---|
| 4,638,175 A | * | 1/1987 | Bradford et al. | ............... 307/80 |
| 5,703,415 A | * | 12/1997 | Tanaka | ........................ 307/66 |
| 5,768,117 A | * | 6/1998 | Takahashi et al. | ............. 307/82 |
| 5,861,684 A | * | 1/1999 | Slade et al. | .................... 307/23 |
| 5,939,799 A | * | 8/1999 | Weinstein | ..................... 307/64 |
| 6,430,068 B1 | * | 8/2002 | Sadler et al. | .................. 363/65 |
| 7,051,216 B2 | * | 5/2006 | Suzuki et al. | ............... 713/340 |
| 2005/0141184 A1 | * | 6/2005 | Suzuki et al. | ............... 361/683 |

FOREIGN PATENT DOCUMENTS

| | | |
|---|---|---|
| DE | 198 51 261 A1 | 11/1998 |
| EP | 1 411 523 A2 | 6/2003 |
| JP | 11-168832 | 12/1997 |
| JP | 2003-189600 | 12/1997 |
| JP | 2004-180500 | 1/2004 |
| WO | WO 97/11426 | 9/1996 |

* cited by examiner

*Primary Examiner*—Albert W Paladini
*Assistant Examiner*—Hal I Kaplan
(74) *Attorney, Agent, or Firm*—Reed Smith LLP; Juan Carlos A. Marquez, Esq.

(57) ABSTRACT

The power supply device of the present invention supplies power highly reliably by suppressing an increase in costs even when a multiplicity of load groups are present. When operating normally, each of the normal power supply units supplies power via a normal path to each of the load groups. One redundant power supply unit is provided for a plurality of normal power supply units. When any of the normal power supply units fail, the redundant power supply unit continues to supply power to the load group via the redundant path. A diode for connecting the redundant path to the normal path is provided in each normal power supply unit and the redundant paths that are routed through the respective normal power supply units are connected so as to intersect one another between the normal power supply units.

9 Claims, 21 Drawing Sheets

FIG. 12
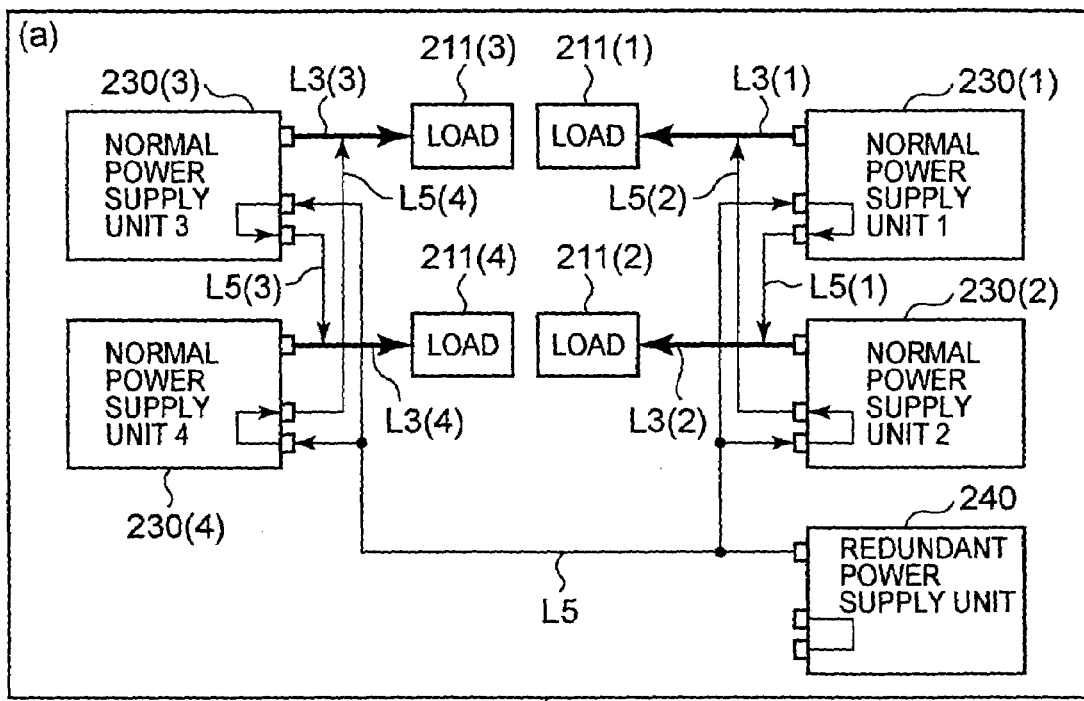
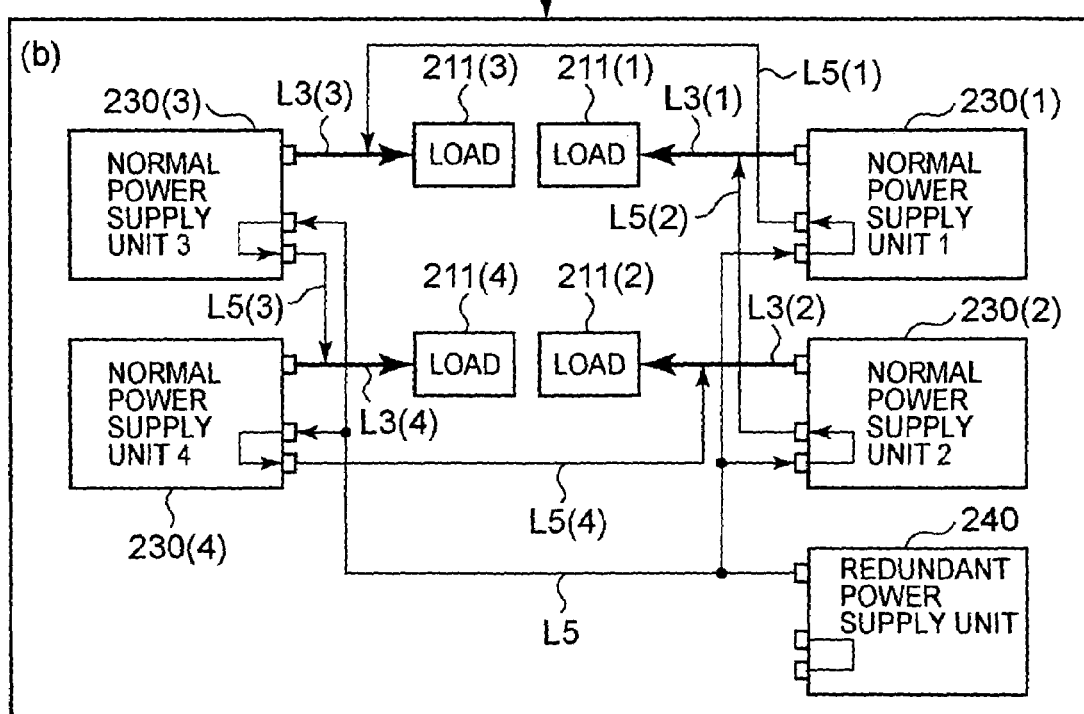

FIG. 14
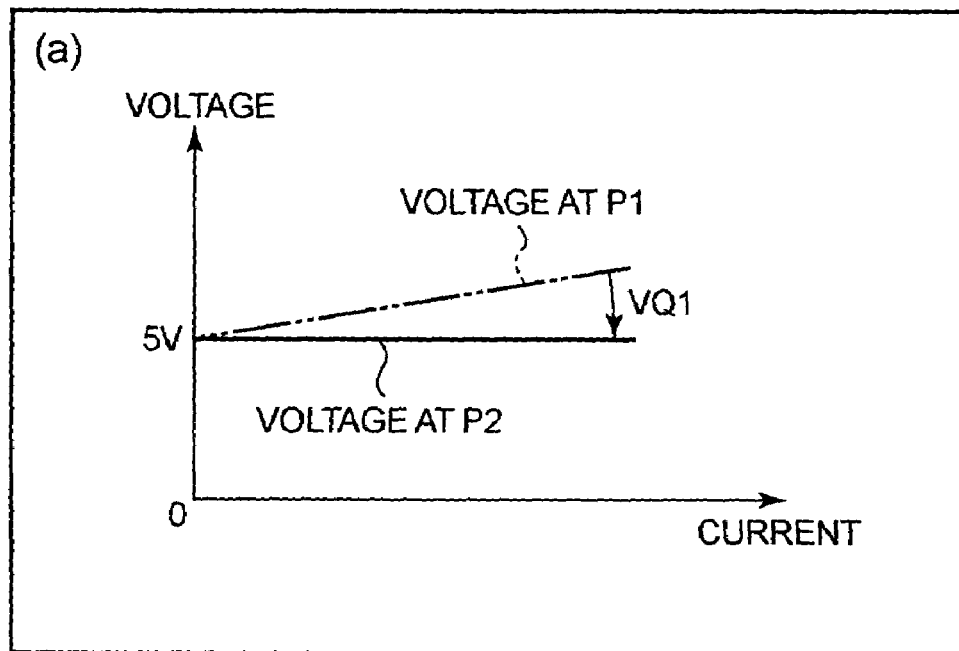
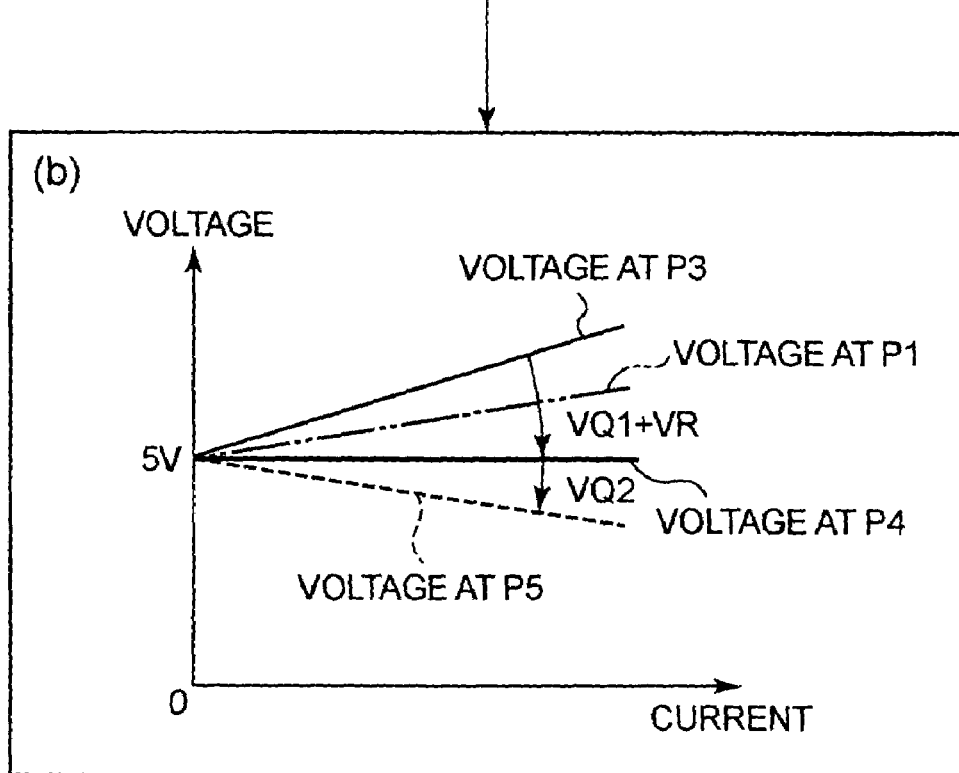

FIG. 16
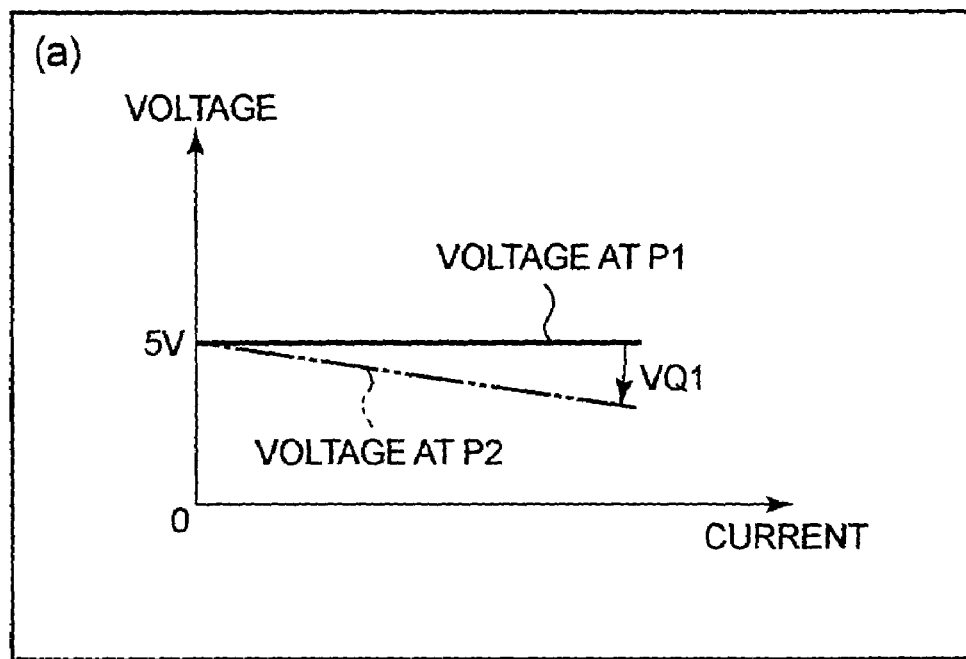
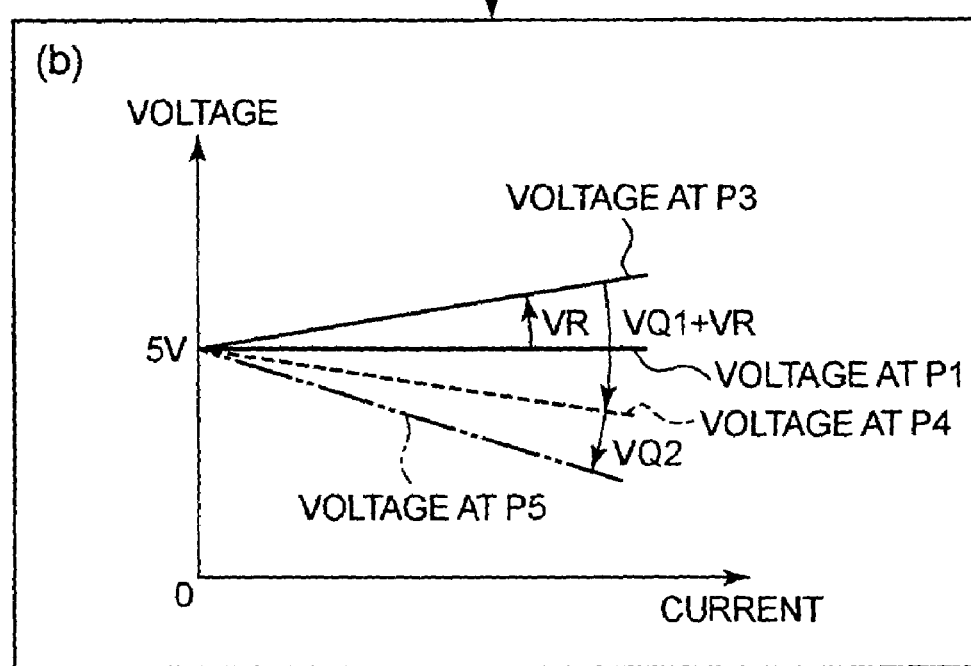

FIG. 17
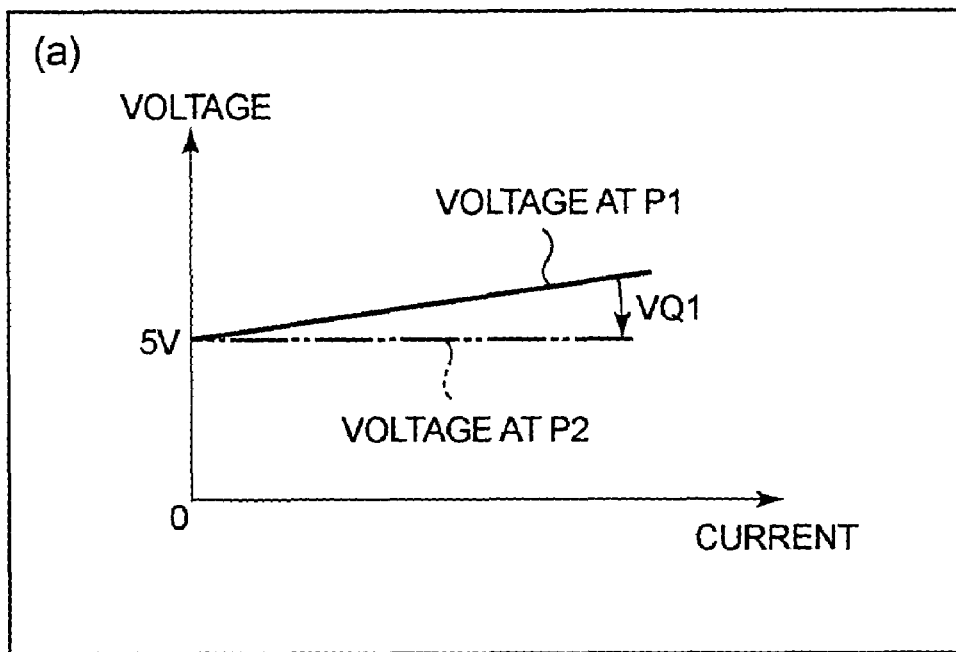
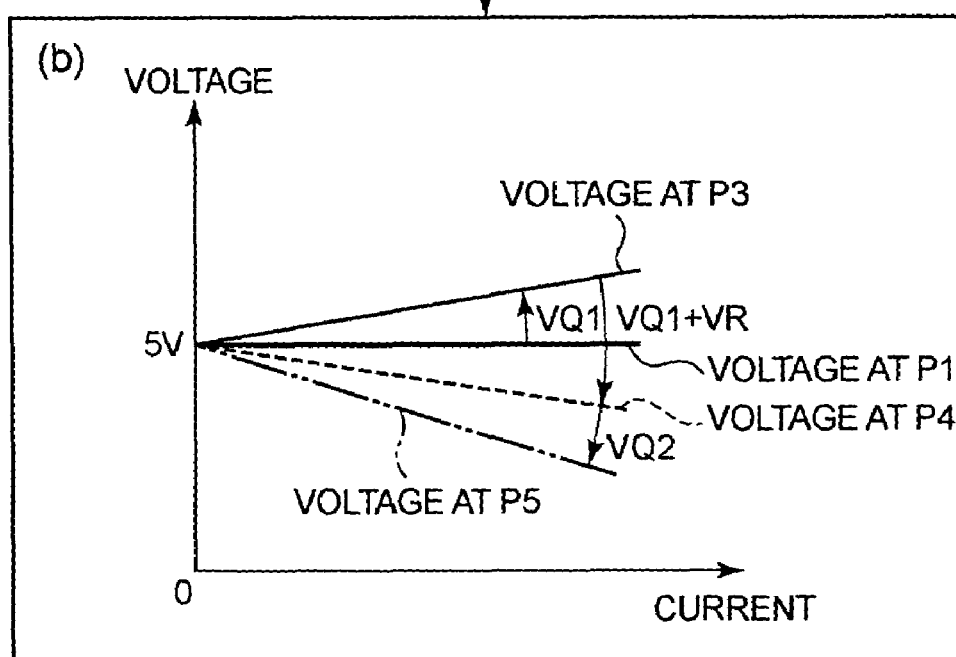

FIG. 19
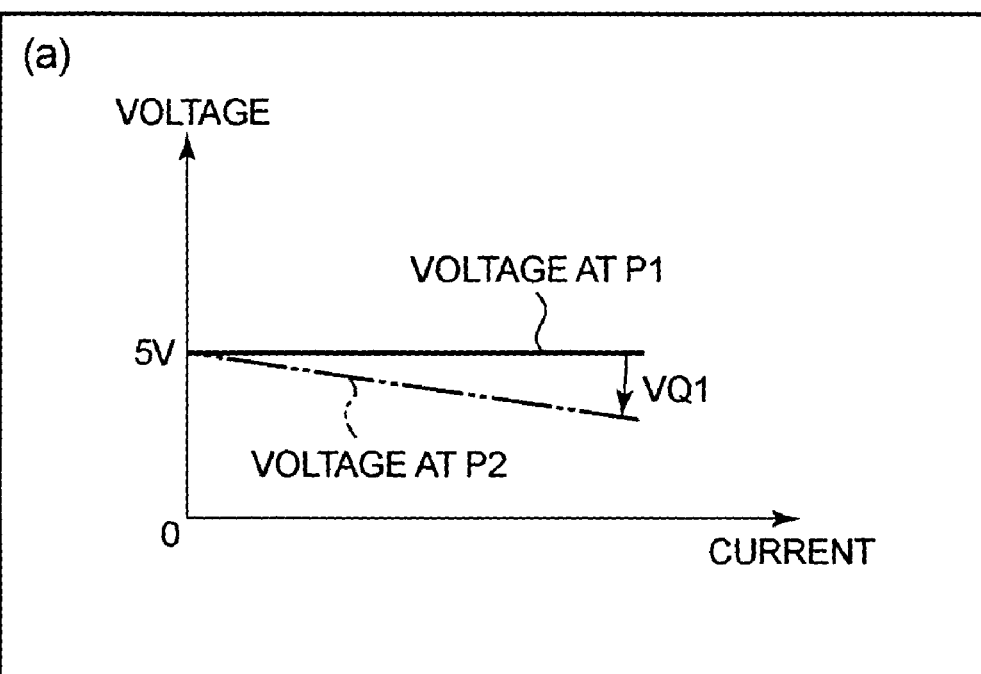
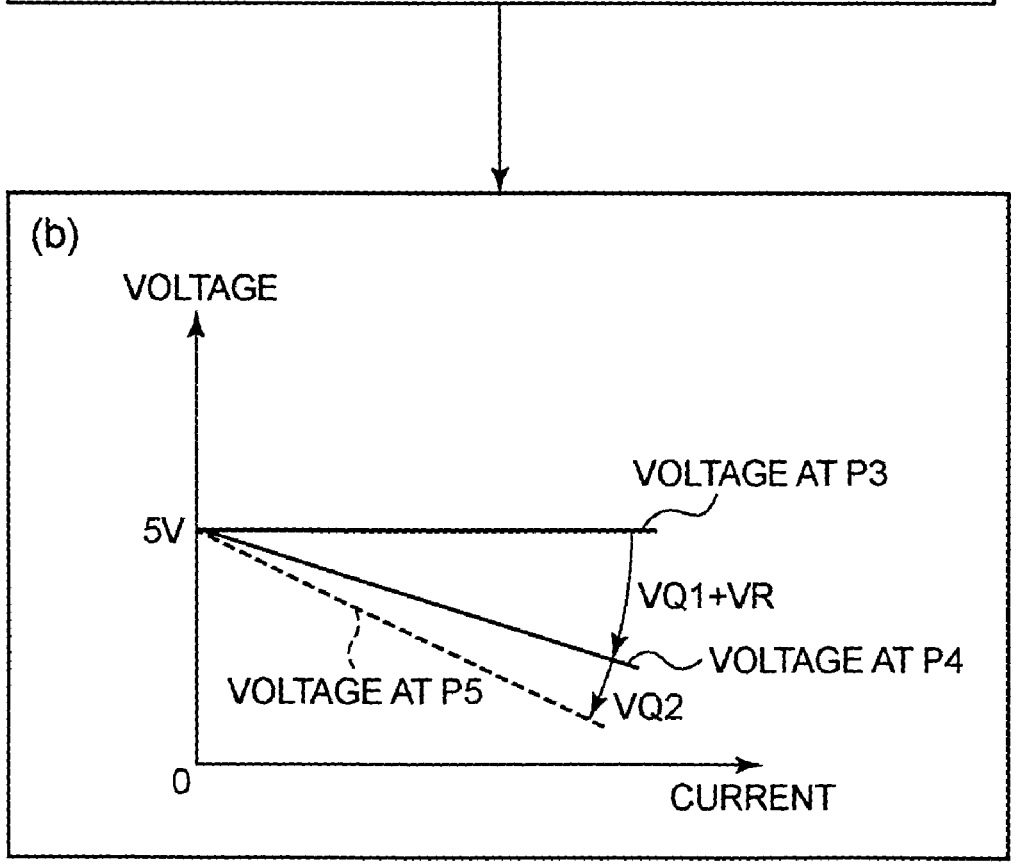

POWER SUPPLY DEVICE AND POWER SUPPLY METHOD

CROSS-REFERENCE TO RELATED APPLICATIONS

This application relates to and claims priority from Japanese Patent Application No. 2006-55413 filed on Mar. 1, 2006, the entire disclosure of which is incorporated herein by reference.

BACKGROUND OF THE INVENTION

1. Field of the Invention

The present invention relates to a power supply device that can be used, for example, in a storage control device and to a power supply method.

2. Description of the Related Art

Storage control devices comprise a storage section that is produced by connecting a multiplicity of hard disk drives in the form of an array. Storage control devices provide a host computer ('host' hereinbelow) such as a server with logical storage areas (logical volumes).

In order to increase reliability and high availability and so forth, a storage control device provides the host with redundant storage areas based on RAID (Redundant Array of Independent Disks). Further, storage control devices render various resources such as microprocessors and communication lines redundant. The power supply device of a storage control device is also redundant from the perspective of such high reliability and high availability.

Therefore, in the prior art, a plurality of hard disk drives constitute one group and a plurality of power supply units are allocated to each group (Japanese Patent Application Laid Open No. H11-168832). Normally, when power is supplied from one power supply unit to each of the hard disk drives in a group and the one power supply unit fails, there is an automatic switch to the other power supply unit and power is supplied from the other power supply unit to each of the hard disk drives.

Because each of the groups in the device mentioned in Japanese Patent Application Laid Open No. H11-168832 is provided with a plurality of power supply units, the number of power supply units required increases as the number of groups rises. Further, while the one power supply unit is functioning normally, the other power supply unit does not function. Therefore, because there is a multiplicity of power supply units that are not normally used in the prior art, there is an increase in costs. Further, in the prior art, because there is large number of power supply units, there is the problem that it is difficult to install a greater number of hard disk drives in the storage control device.

SUMMARY OF THE INVENTION

The present invention was conceived in view of the above problems and an object of the present invention is to provide a power supply device and power supply method that permit an increase in reliability without a marked increase in costs even in the event of an increase in the number of loads to be supplied with power. Further objects of the present invention will become evident from the subsequent description of the embodiments.

In order to solve this problem, the power supply device according to one aspect of the present invention is a power supply device for supplying power to a plurality of load groups each comprising a plurality of loads, comprising: a plurality of exchangeable first power supply units that are connected to the load groups respectively via a first path; at least one exchangeable second power supply units that are connected to the load groups respectively via a second path; and a path selection section that chooses whether power is supplied to the load groups via either the first path or the second path, for each of the load groups. Each of the path selection sections selects the first path when operation is normal and the second path when the operation is not normal.

According to an aspect of the present invention, each of the path selection sections is provided on the second path and located within each of the first power supply units.

According to an aspect of the present invention, each of the path selection sections performs the selection between the second path and another first path that is connected to another first power supply unit.

According to an aspect of the present invention, each of the second paths is connected to the first path constituting a connection destination via another of the first power supply units that is different from the first power supply unit comprising the first path constituting the connection destination; and each of the path selection sections is constituted as a back current prevention element that is provided on the second path and located within the other first power supply unit.

According to an aspect of the present invention, each of the first power supply units and the second power supply unit are constituted having the same structure.

According to an aspect of the present invention, each of the first power supply units is constituted comprising: a main circuit that converts electrical power that is input into a DC output and outputs the DC output; a back current prevention element that allows the DC output from the main circuit to be supplied to the first path and prevents current flow in the reverse direction; and a correction circuit which detects a voltage drop that is produced by the back current prevention element and which corrects the DC output of the main circuit to compensate for the voltage drop.

According to an aspect of the present invention, a monitoring circuit that monitors an output voltage and outputs a warning signal when an anomaly is detected in the output voltage is provided in each of the first power supply units and the second power supply units.

A power supply method according to another aspect of the present invention is a power supply method for supplying power to a plurality of load groups each comprising a plurality of loads, comprising the steps of: connecting the output side of a plurality of first power supply units to each of the load groups via a first path; connecting each one end of a plurality of second paths to a first path constituting a connection destination via another of the first power supply units that is different from the first power supply unit comprising the first path constituting the connection destination; connecting the other end of each of the second paths to the output side of the second power supply unit; and providing back current prevention elements that allow current to flow from the second power supply unit to the load group and prevent the flow of current in the reverse direction, midway along each of the second paths within each of the first power supply units.

A power supply device of a storage control device according to yet another aspect of the present invention is a power supply device used in a storage control device that comprises a plurality of storage devices, wherein a plurality of parity groups can each be configured by means of a plurality of the storage devices, and each of the load groups is formed by each of a plurality of the storage devices constituting the respective parity groups such that the respective storage devices belong to a different load group, comprising: a plurality of first power supply units; at least one second power supply unit; and a connection substrate for connecting each of the first power supply units and the second power supply units to the respective load groups, wherein the connection substrate is provided with: a plurality of first paths each one end of which is connected to the output side of the first power supply unit, and each other end of which is connected to the load group; and a plurality of second paths each one end of which is connected to the first path constituting the connection destination via another of the first power supply units that is different from the first power supply unit having the first path constituting the connection destination, and each other end of which is connected to the output side of the second power supply unit. Back current prevention elements that allow current to flow from the second power supply unit to the load group and prevent the flow of current in the reverse direction are each provided midway along the second path within the respective first power supply units.

BRIEF DESCRIPTION OF THE DRAWINGS

FIG. 9A shows the output voltage of a normal power supply unit and FIG. 9B shows the output voltage of a redundant power supply unit;

FIG. 12 is an explanatory diagram schematically showing the mode of connection between the respective power supply units of the power supply device according to a third embodiment of the present invention;

FIG. 14 is a characteristic diagram showing an output voltage characteristic;

FIG. 16 is a characteristic diagram showing an output voltage characteristic;

FIG. 17 is another characteristic diagram showing an output voltage characteristic;

FIG. 19 is a characteristic diagram showing an output voltage characteristic;

DESCRIPTION OF THE PREFERRED EMBODIMENTS

Figure 1:
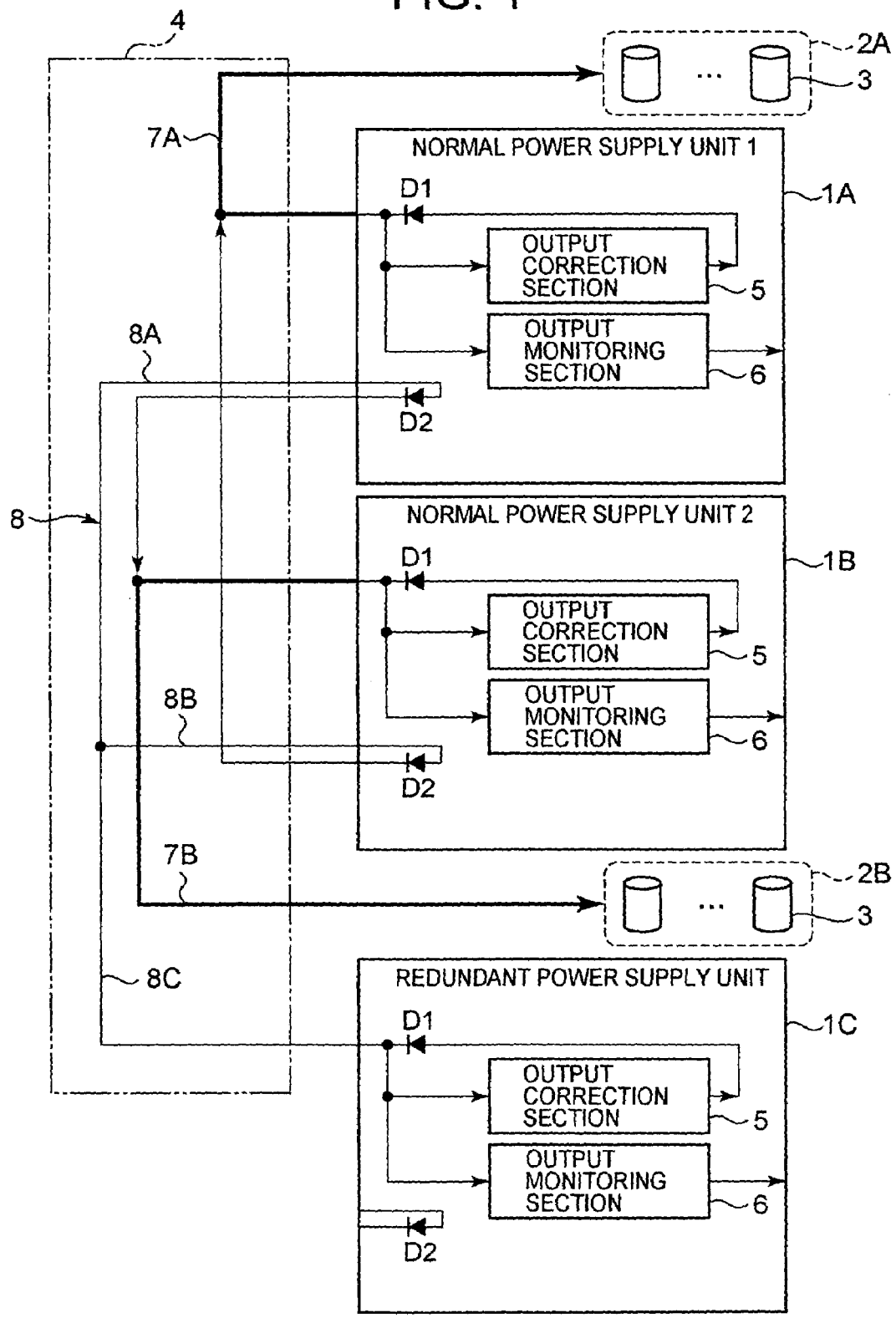
FIG. 1 is an explanatory diagram showing the concept of an embodiment of the present invention.

An embodiment of the present invention will be described hereinbelow based on the drawings. This embodiment will be described by taking a case where a storage control device is used by way of example. FIG. 1 is an explanatory diagram showing an overall schematic of the power supply device of this embodiment.

The power supply device can be constituted comprising a plurality of normal power supply units 1A and 1B each connected to a plurality of disk drives 3, one redundant power supply unit 1C, and a connection substrate 4, for example. Each of the units 1A, 1B, and 1C and the disk drives 3 and connection substrate 4 can be provided in the same enclosure, for example. Here, each of the normal power supply units 1A and 1B corresponds to a 'first power supply unit' and the redundant power supply unit 1C corresponds to a 'second power supply unit'. Each of the power supply units 1A, 1B, and 1C can be provided with the same structure as will be mentioned subsequently.

Each of the normal power supply units 1A and 1B supply power of a predetermined voltage to each of load groups 2A and 2B. That is, the first normal power supply unit 1A supplies power to the first load group 2A and the other normal power supply unit 1B supplies power to the other load group 2B.

Each of the load groups 2A and 2B comprise a predetermined number (eight, for example) of the disk drives 3. The disk drives 3 are not limited to hard disks. Semiconductor memory and optical disks and so forth may also be used as the disk drives 3. Power is supplied by means of the load groups 2A and 2B. Therefore, the load groups 2A and 2B can also be called supply units.

Only one redundant power supply unit 1C is provided for a plurality of normal power supply units 1A and 1B. That is, the redundant power supply unit 1C backs up N (N is a natural number of two or more) normal power supply units 1A and 1B. When any of the normal power supply units appears to have stopped functioning, the redundant power supply unit 1C supplies power to the load group in place of the stopped normal power supply unit.

The connection substrate 4 handles connections between each of the power supply units 1A, 1B, and 1C and connections between the respective power supply units 1A, 1B, and 1C and the disk drives 3. The connection substrate 4 is constituted as a printed wiring substrate, for example. Normal paths 7A and 7B and redundant paths 8A and 8B are each formed on the connection substrate 4. The normal paths 7A and 7B correspond to a 'first path' and the redundant paths 8A and 8B correspond to a 'second path'. Further, as will also be evident from subsequent embodiments, input paths or the like for supplying power inputted from an AC/DC power supply to the respective power supply units 1A, 1B, and 1C is also formed on the connection substrate 4.

Each of the normal paths 7A and 7B are wiring for supplying power outputted by the normal power supply units 1A and 1B to each of the disk drives 3 in the load groups 2A and 2B. In a normal case where each of the power supply units 1A and 1B is functioning normally, the normal paths 7A and 7B are used to supply electricity to the respective disk drives 3.

The input side of a first normal path 7A is connected to the cathode of an output diode D1 in the first normal power supply unit 1A. The output side of the normal path 7A is connected to each of the disk drives 3. Here, the output diode D1 is provided for the purpose of back current prevention and is provided to allow the flow of current from the normal power supply unit 1A to each of the disk drives 3 and to obstruct the flow of current in the reverse direction. In a normal case, the power that is output by the normal power supply unit 1A is supplied to each of the disk drives 3 in the load group 2A via the normal path 7A.

Likewise, the input side of the other normal path 7B is connection to the output diode D1 in the normal power supply unit 1B and the output side of the normal path 7B is connected to each of the disk drives 3 in the load group 2B. The normal power supply unit 1B supplies power to each of the disk drives 3 in the load group 2B via the normal path 7B.

The redundant paths 8A and 8B serve to connect the redundant power supply unit 1C and the disk drives 3 in the respective load groups 2A and 2B. The redundant paths 8A and 8B branch off from a common bus 8C that is connected to the output diode D1 in the redundant power supply unit 1C and are connected midway along the predetermined normal paths 7A and 7B via a redundant-connection diode D2 in the normal power supply units 1A and 1B. The redundant-connection diode D2 corresponds to a 'path selection section'.

The input side of the first redundant path 8A is connected to the output diode D1 of the redundant power supply unit 1C via the common bus 8C. The output side of the redundant path 8A is connected midway along the normal path 7B of another normal power supply unit 1B via the redundant-connection diode D2 in the normal power supply unit 1A.

That is, the redundant path 8A is OR-connected to the normal path 7B of another normal power supply unit 1B through which the redundant path 8A does not pass by means of a redundant-connection diode D2. Here, only an output diode D1 in the normal power supply unit 1B is provided on the normal path 7B and the output diode D1 in the redundant power supply unit 1C and redundant-connection diode D2 in the normal power supply unit 1A are provided on the redundant path 8A. Therefore, because the normal path 7B and redundant path 8A have different diode-stage number weightings, when the normal power supply unit 1B is functioning normally, the normal path 7B is used as a power supply path. On the other hand, when the functions of the normal power supply unit 1B stop as a result of failure or the like, the path that passes through the normal path 7B from the redundant path 8A is automatically selected as a power supply path.

Likewise, the input side of the redundant path 8B is connected to the output diode D1 of the redundant power supply unit 1C via the normal bus 8C. The output side of the redundant path 8B is OR-connected midway along the normal path 7A of the other normal power supply unit 1A through which the redundant path 8B does not pass via the redundant-connection diode D2 in the normal power supply unit 1B. The redundant path 8B and normal path 7A have different numbers of diode stages provided midway therealong. Therefore, in a normal case, power is supplied to the respective disk drives 3 in the load group 2A from the normal power supply unit 1A and, in a case where an outage or the like occurs, power is supplied from the redundant power supply unit 1C to the respective disk drives 3.

Thus, the redundant paths 8A and 8B are each connected to the normal paths 7A and 7B constituting the connection targets via the redundant-connection diodes D2 in the normal power supply units 1A and 1B that comprise normal paths 7A and 7B that are different from the normal paths 7A and 7B constituting the connection targets. That is, the normal power supply unit 1A and normal power supply unit 1B are connected to one another such that the redundant paths 8A and 8B intersect each other. Further, as will be described subsequently, the constitution is not limited to a mode of connection in which the two normal power supply units same form an intersecting connection. Three or more normal power supply units may be connected in a loop shape.

Thus, the power supply path can be maintained even in a case where a normal power supply unit having a connection-target normal path is exchanged by connecting a redundant path to the connection-target normal path via the redundant-connection diode D2 in a normal power supply unit that differs from the connection-target normal power supply unit.

Each of the power supply units 1A, 1B, and 1C have the same structure and the role of each of the power supply units is decided by the position of attachment to the connection substrate 4. When attached in the position of the normal power supply unit that supplies power to the load group 2A, this power supply unit functions as the normal power supply unit 1A. Likewise, when attached in the position of the normal power supply unit that supplies power to the load group 2B, this power supply unit functions as the normal power supply unit 1B. The power supply unit connected to the redundant path 8C functions as the redundant power supply unit 1C. The redundant-connection diode D2 is not used by the power supply unit that is used as the redundant power supply unit 1C. The redundant-connection diode D2 consequently has a useless constitution but, because the respective power supply units 1A, 1B and 1C have the same structure, power supply unit fabrication costs and management costs are reduced. However, the constitution is not limited to a case where the respective power supply units 1A, 1B and 1C have the same structure. The normal power supply units 1A and 1B and the redundant power supply unit 1C can also be fabricated each with a different constitution. In the example shown in FIG. 1, at least the redundant-connection diode D2 can be removed from the redundant power supply unit 1C.

Each of the power supply units 1A, 1B, and 1C comprises an output correction section 5 and an output monitoring section 6. The output correction section 5 is a circuit for correcting the voltage drop of the output diode D1. The output monitoring section 6 is a circuit for detecting anomalies in the output voltage. Detected differences are output to an external management device or the like, for example.

This embodiment, which has such a constitution, affords the following effects. This embodiment is constituted such that one redundant power supply unit 1C is allocated to a plurality of normal power supply units 1A and 1B and, even when either of the normal power supply units 1A and 1B stops functioning, power can be supplied by the redundant power supply unit 1C to each of the disk drives 3. Therefore, the costs of the power supply device can be reduced in comparison with a constitution in which redundant power supply units are individually allocated to the respective normal power supply units 1A and 1B.

In this embodiment, the normal paths 7A and 7B and redundant paths 8A and 8B are OR-connected via the redundant-connection diode D2 and the number of diode stages of the normal paths 7A and 7B and redundant paths 8A and 8B can be made different. Therefore, when the normal power supply units 1A and 1B are functioning normally, the normal power supply units 7A and 7B can be defined as power supply paths. When the normal power supply units 1A and 1B stop functioning, the power supply paths can be automatically and rapidly switched to the redundant paths 8A and 8B. Further, even when the output of the redundant power supply unit 1C short-circuits, the supply of power form the normal paths 7A and 7B can be interrupted by cutting off the redundant-connection diode D2. Thus, the power supply path can be selected and reliability can be improved by means of a relatively simple constitution.

This embodiment is constituted such that the redundant-connection diode D2 is provided in each of the normal power supply units 1A and 1B. Hence, the redundant power supply unit 1C and each of the normal power supply units 1A and 1B can be connected via the common bus 8C or the like. As a result, the number of wirings formed on the connection substrate 4 can be reduced and the constitution of the connection substrate 4 can be simplified.

In this embodiment, a redundant path and connection-target normal path can be connected via the redundant-connection diode D2 in a normal power supply unit that differs from the connection-target normal power supply unit. Therefore, the power supply path can be maintained even in a case where a normal power supply unit with the connection-target normal path is exchanged. Further, because it is not necessary to provide the redundant-connection diode D2 on the connection substrate 4, it is possible to increase the reliability of the connection substrate 4, whereby the reliability of the power supply device can be improved.

This embodiment is constituted such that each of the power supply units 1A, 1B, and 1C has the same structure. The power supply unit fabrication costs and management costs can be reduced in comparison with a case where the normal power supply units 1A and 1B and the redundant power supply unit 1C have different constitutions.

This embodiment is constituted such that each of the power supply units 1A, 1B and 1C contains the output correction section 5. Therefore, the voltage drop of the output diode D1 can be corrected and a stabilized output can be obtained.

This embodiment is constituted such that each of the power supply units 1A, 1B and 1C contains the output monitoring section 6. Hence, when there is an anomaly with the output voltage of each power supply unit, this anomaly can be detected immediately and reported to the outside.

Further, a case where the output diode D1 and redundant-connection diode D2 were used as back current prevention elements was illustrated in FIG. 1. However, the present invention is not limited to or by diodes and is also able to employ other back current prevention elements. For example, when diode-produced power loss is not permitted, MOS-FETs (Metal Oxide Semiconductor Field Effect Transistors) that have a small amount power loss can also be used as the back current prevention elements.

Figure 2:
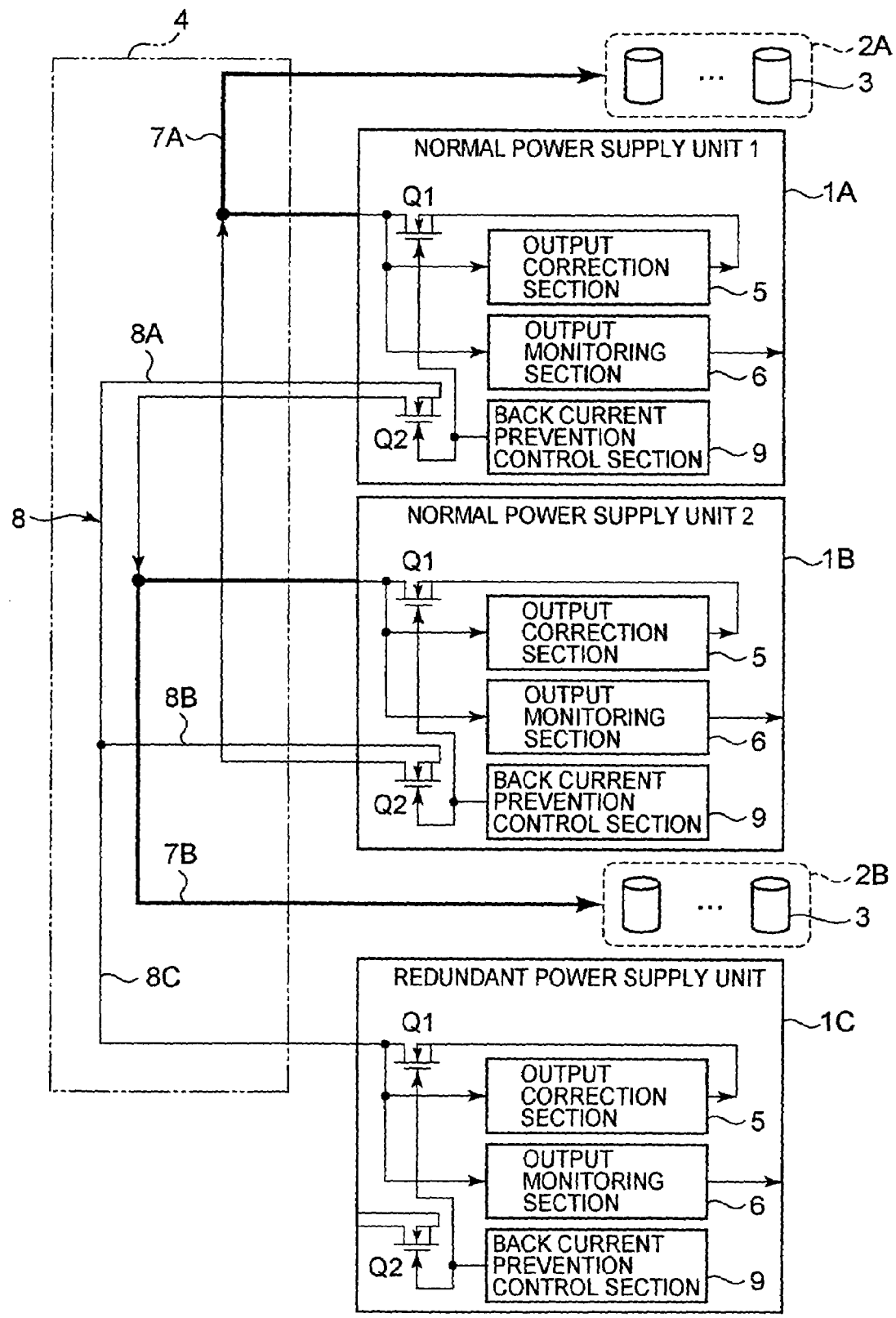
FIG. 2 is an explanatory diagram showing the concept of another embodiment of the present invention.

FIG. 2 is an explanatory diagram showing an example of a case where MOS-FETs are used for the back current prevention elements. In this embodiment, MOS-FETs Q1 and Q2 are adopted instead of the output diode D1 and redundant-connection diode D2 in FIG. 1. In addition, in this embodiment, a back current prevention function can be implemented by providing back current prevention control sections 9 for controlling each of the MOS-FETs Q1 and Q2. The back current prevention control sections 9 control the current flowing from the source to the drain to prohibit the flow of current in the reverse direction by applying a signal of a predetermined voltage to the gate of each of the MOS-FETs Q1 and Q2.

The constitution of this embodiment is also included within the scope of the present invention. By adopting the constitution of this embodiment, power loss can be reduced in comparison with a constitution where diodes are used.

The details of the power supply device of this embodiment will be provided hereinbelow. First, the constitution of the storage control device that is used by the power supply device will be described, and then the details of the power supply device will be provided. Further, the constitution that employs diodes as the back current prevention elements will be described first, followed by the constitution in which MOS-FETs are used.

First Embodiment

Figure 3:
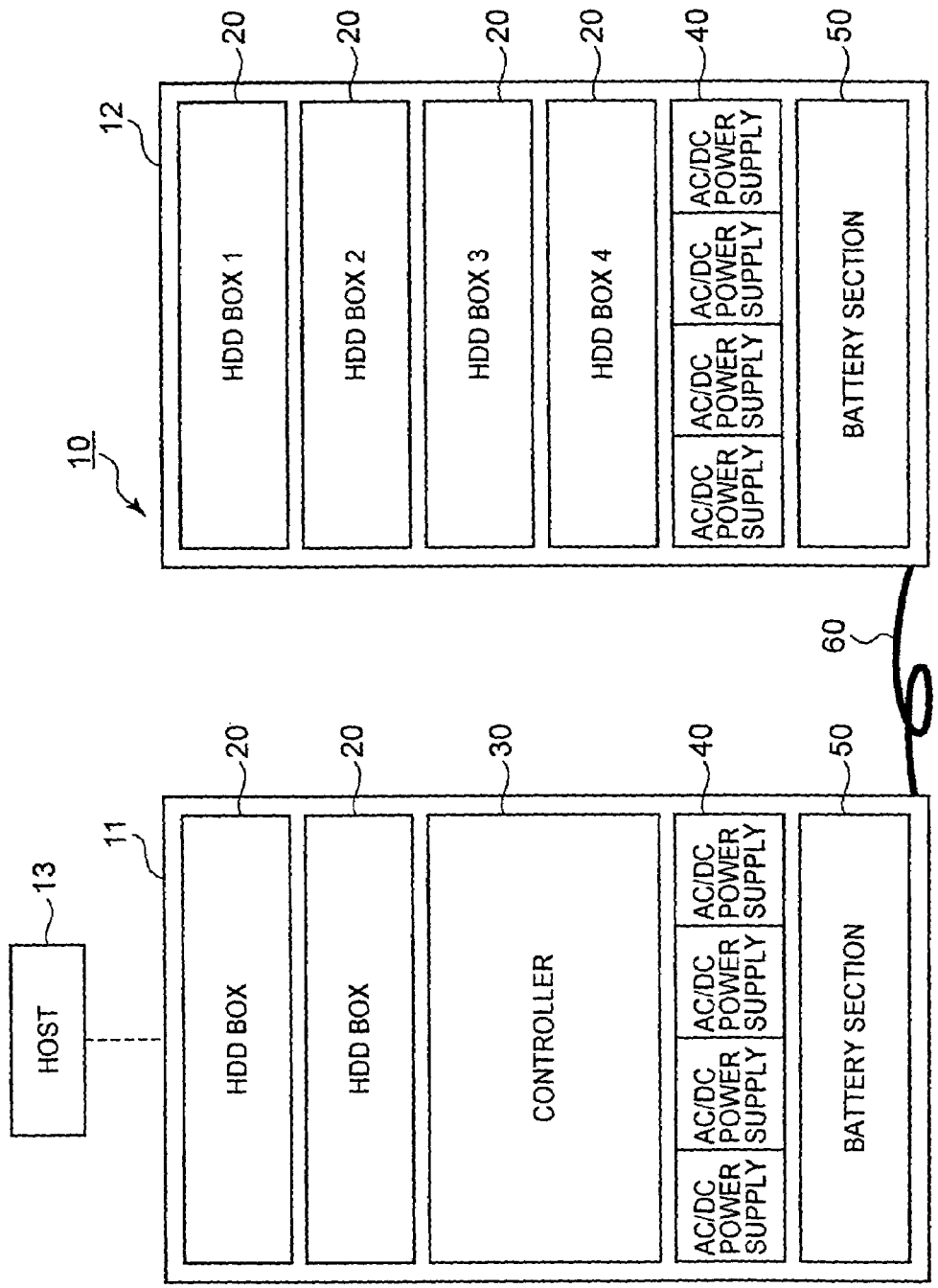
FIG. 3 is a front view of a storage control device.

FIG. 3 schematically shows as aspect in which a storage control device 10 is viewed from the front. The storage control device 10 is constituted by using a cable 60 to connect a basic enclosure 11 that has a control function and an additional enclosure 12 for increasing the storage capacity, for example. A host 13, which is a host computer device, is connected to the basic enclosure 11.

The basic enclosure 11 comprises a basic constitution of the storage control device 10. The basic functions of the storage control device 10 can be implemented by the basic enclosure 11 alone. The basic enclosure 11 is constituted comprising a plurality of hard disk boxes ('HDD boxes' hereinbelow) 20, a controller 30, AC/DC power supply units 40, and a battery section 50, for example. The additional enclosure 12 is prepared as an optional product that is used to expand the storage capacity of the storage control device 10. The additional enclosure 12 comprises a plurality of HDD boxes 20, an AC/DC power supply unit 40, and a battery section 50, for example. Each of the enclosures 11 and 12 comprises a separate power supply constitution. Further, the constitution of the storage control device 10 is not limited to that shown in FIG. 3. For example, the constitution may be such that the HDD boxes are removed from the basic enclosure 11 and only the control function is provided.

Each of the HDD boxes 20 comprise a plurality of disk drives 210 (see FIG. 4) and is charged with the provision of storage areas. The constitution of each of the HDD boxes 20 will be described subsequently in conjunction with FIG. 4. The controller 30 is charged with a control function of the storage control device 10. The constitution of the controller 30 will be described subsequently in conjunction with FIG. 5.

The AC/DC power supply unit 40 converts AC power supplied from the outside into DC power on the order of a few volts. The battery section 50 supplies abnormal DC power when the AC power from the outside stops due to a power outage or the like, for example. As a result, when a power outage or the like occurs, write data that is stored in a cache memory 130 (See FIG. 5) is written to a disk drive 210 by using power from the battery section 50.

Figure 4:
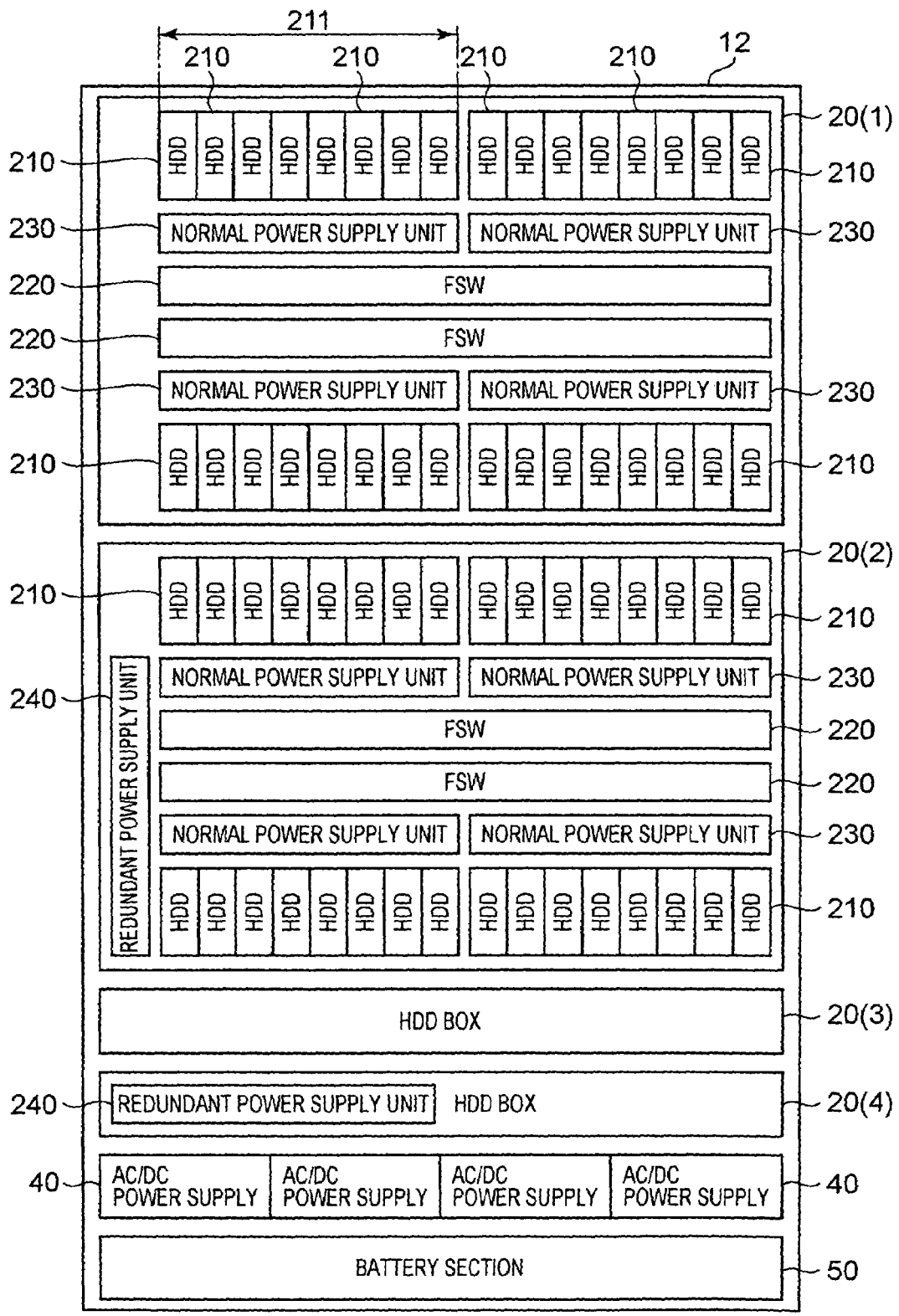
FIG. 4 is an explanatory diagram showing the constitution of a hard disk box.

FIG. 4 is a front view showing a detailed constitution of the additional enclosure 12. The constitution of the HDD box 20 will now be described by using FIG. 4. The additional enclosure 12 comprises four of the HDD boxes 20 at the front and rear respectively, for example. That is, the additional enclosure 12 can comprise a total of eight HDD boxes. FIG. 4 shows four HDD boxes 20 that are provided at the front of the additional enclosure 12. Further, for the sake of expediency in the description, the HDD boxes 20 are described with (1) to (4) following code (20).

Therefore, a total of four redundant power supply groups are each constituted by two HDD boxes 20. Each redundant power supply group contains a predetermined number n (n=8 in the illustrated example) power supply units 211. The redundant power supply groups are backed up by one redundant power supply unit 240. That is, each of the disk drives 210 in each HDD box 20 belonging to the redundant power supply group is backed up by the common redundant power supply unit 240.

In this embodiment, the number n of the power supply units 211 that the single redundant power supply unit 240 is charged with (that is, the number of normal power supply units 230) and the number m of the disk drives 210 constituting one power supply unit 211 are equal (n=m=8). However, this embodiment is not limited to such a constitution and different values may be established for n and m.

In the example shown in FIG. 4, the uppermost HDD box 20(1) and the HDD box 20(2) located directly below the HDD box 20(1) constitute one redundant power supply group. The third HDD box 20(3) and lowermost HDD box 20(4) also constitute another redundant power supply group. Each of the redundant power supply groups is provided with one redundant power supply unit 240.

The basic constitution of the HDD boxes 20 will now be described. The HDD boxes 20(1) to 20(4) comprise a plurality of disk drives 210, a plurality of fiber connection control sections ('FSW' hereinbelow) 220 and a plurality of normal power supply units 230.

The disk drive 210 is constituted as a hard disk drive such as an ATA (AT Attachment) disk, a SCSI (Small Computer System Interface) disk, or an FC (Fibre Path) disk, for example. The disk drive is not limited to such disks, however. Other storage devices such as a semiconductor memory drive, optical disk drive, or magnetic-optical disk drive, for example, may be used.

Figure 6:
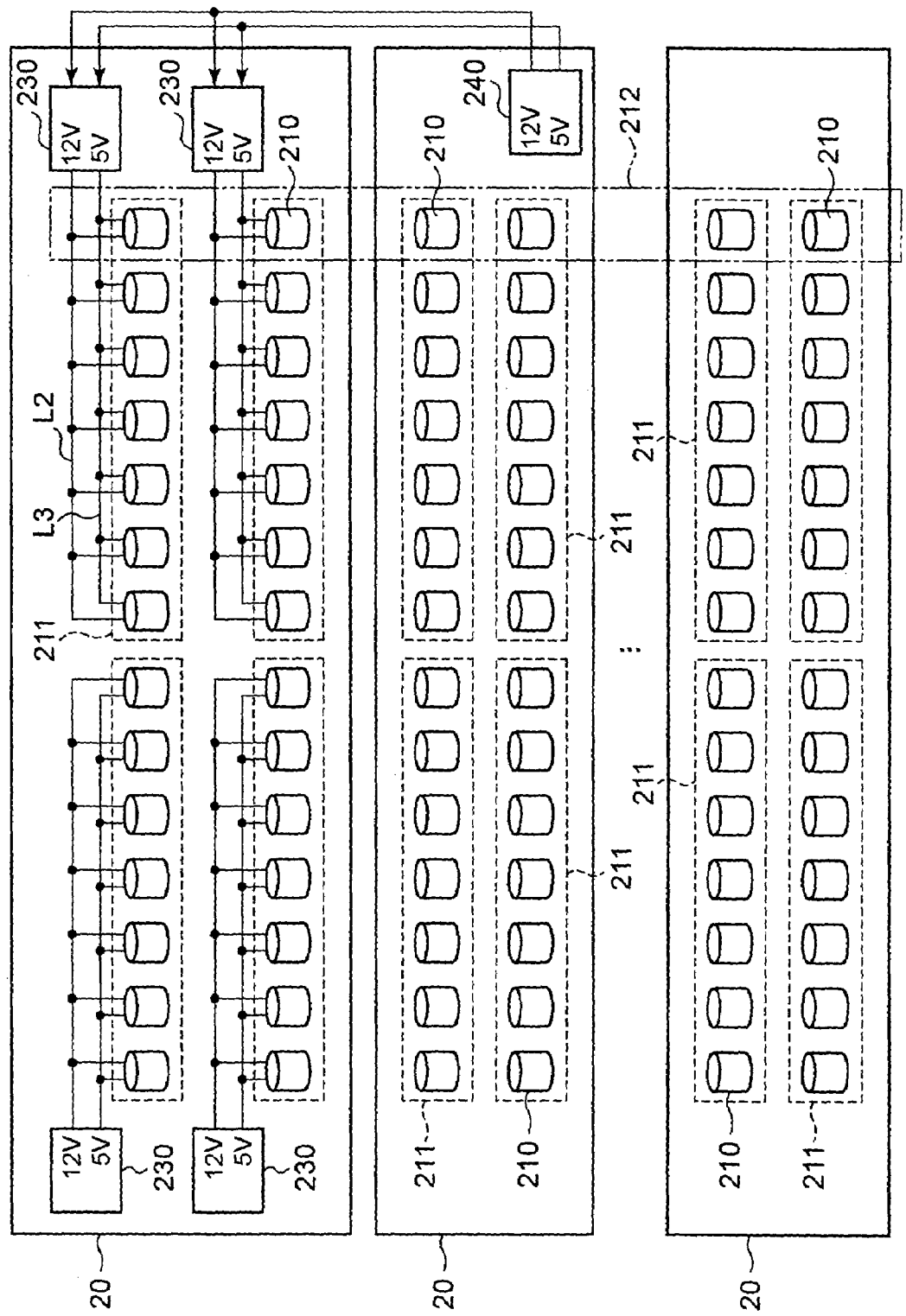
FIG. 6 is an explanatory diagram showing the relationship between a group (power supply unit) that supplies power to each disk drive and a RAID group.

Here, a predetermined number m of disk drives 210 constitute one power supply unit 211 (See FIG. 6). The power supply unit 211 signifies the unit of the group receiving the supply of power and corresponds to the load groups 2A and 2B in FIG. 1. Power is supplied to each of the power supply units 211 belonging to each of the disk drives 210.

Here, '8', for example, can be proposed as the number m of disk drives 210 constituting the power supply unit 211 but the number m is not limited to this value. A total of four power supply units 211 is provided in each HDD box 20 with two power supply units 211 at the top and two power supply units 211 at the bottom. When each power supply units 211 is constituted by eight disk drives 210, each HDD 20 comprises a total of 32 disk drives 210. As mentioned earlier, a total of eight HDD boxes 20, for example, can be installed in the additional enclosure 12 and, therefore, the whole additional enclosure 12 can comprise 256 disk drives 210.

The details will be provided subsequently but a RAID group 212 (See FIG. 5) is constituted by a predetermined number of disk drives 210 such as four per set or eight per set and so forth, for example. The RAID groups 212 each extend over different power supply units 211.

A FSW 220 is a control circuit that is charged with communication between the controller 30 (more precisely, DKA 120 in FIG. 5) and each of the disk drives 210. Pluralities of FSW 220 are provided in the respective HDD boxes 20. Each FSW 220 is connected to a different DKA 120. Further, the respective disk drives 210 are connected to the respective FSW 220. That is, a plurality of communication paths are provided between the controller 30 and respective disk drives 210 so that, even when there a fault is produced in any one communication path, communication can be performed via another communication path. Further, each FSW 220 is capable of monitoring of the voltage state of the disk drive 210 and the operating state of cooling fan and so forth and the monitoring results can also be reported to the controller 30.

One normal power supply unit 230 is provided in each of the power supply units 211. As mentioned earlier, a total of four power supply units 211 are provided in each HDD box 20 and, therefore, each HDD box 20 comprises four individual normal power supply units 230. Each normal power supply unit 230 supplies DC power of a predetermined voltage to each of the disk drives 210 in the power supply units 211 connected to each of the normal power supply units 230.

One redundant power supply unit 240 is provided in each of the redundant power supply groups as mentioned earlier. The redundant power supply unit 240 has the same constitution as the normal power supply unit 230. When any one of the normal power supply units 230 belonging to the redundant power supply group stops functioning due to the occurrence of a fault, the redundant power supply unit 240 supplies power to the power supply unit 211 instead of the normal power supply unit 230 that has stopped functioning. The details of the normal power supply unit 230 and redundant power supply unit 240 will be described subsequently in conjunction with FIG. 7.

Figure 5:
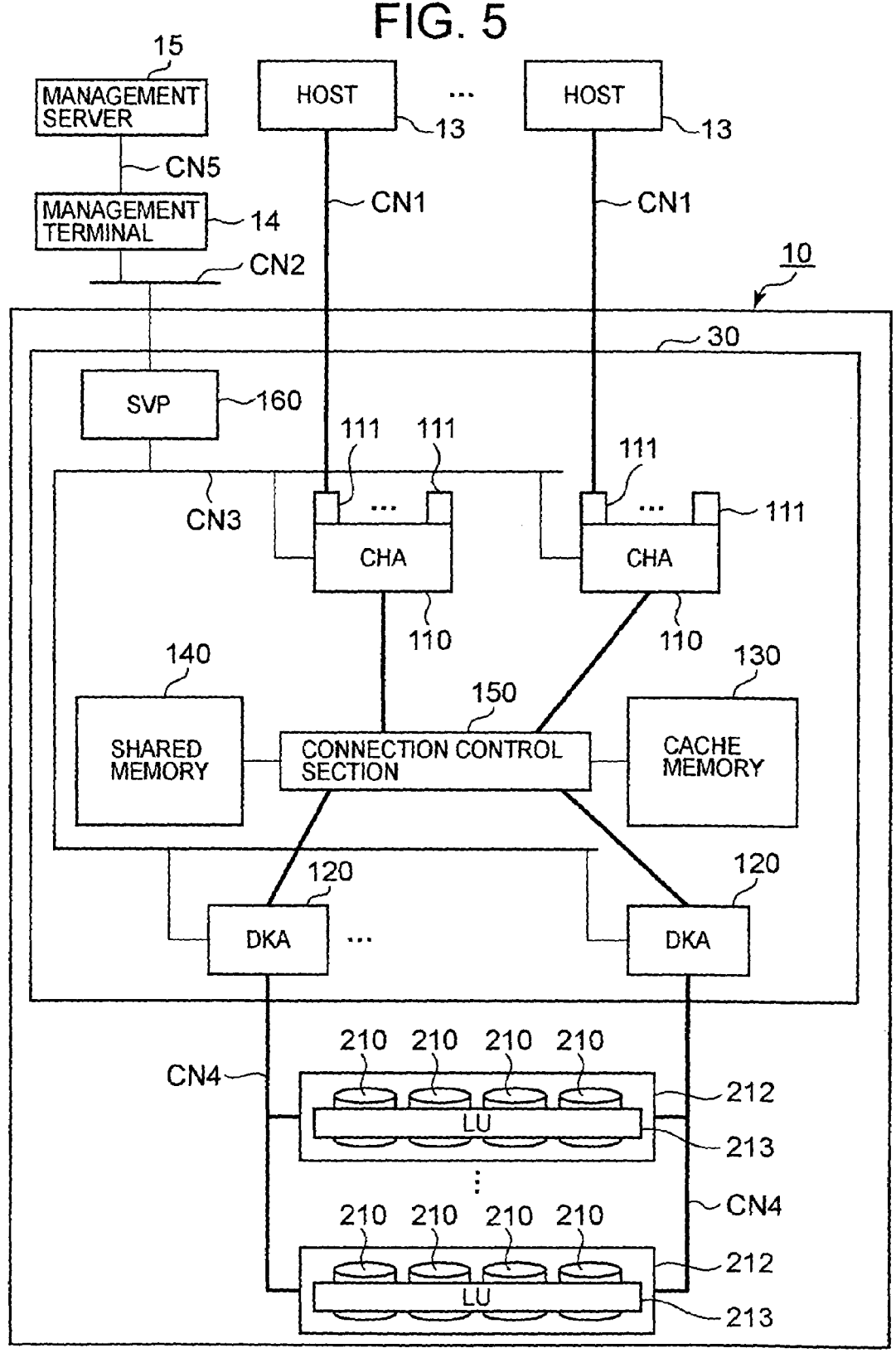
FIG. 5 is a block diagram of a storage control device.

FIG. 5 is a block diagram of the storage control device 10. First, the whole of the storage system comprising the storage control device 10 will be described, followed by a description of the details of the controller 30.

The storage control device 10 can be connected to a plurality of hosts 13 via a communication network CN1. The hosts 13 access the storage control device 10 in accordance with a request from a client terminal (not illustrated in FIG. 3) and read and write data, for example. Hosts 13 can be a mainframe computer or server computer or the like, for example. The communication network CN1 can be a LAN (Local Area Network), a SAN (Storage Area Network), the Internet, or a dedicated line or the like, for example.

When a LAN is used, the host computer 13 and storage control device 10 perform communications in accordance with TCP/IP (Transmission Control Protocol/Internet Protocol). When a SAN is used, the host computer 13 and storage control device 10 perform communications in accordance with the Fiber Path protocol. Further, when the host computer 13 is a mainframe computer, a data transfer is performed in accordance with a communication protocol such as FICON (Fibre Connection: registered trademark), ESCON (Enterprise System Connection: registered trademark), ACONARC (Advanced Connection Architecture: registered trademark), FIBARC (Fibre Connection Architecture: registered trademark), for example.

A management terminal 14 can also be connected via a management communication network CN2 to the storage control device 10. The management terminal 14 is a computer terminal for making various settings of the storage control device 10. The management terminal 14 can be connected to a management server 15 via a communication network CN5. The management server 15 is a device for batchwise management of a plurality of the storage control device 10. Examples of the communication networks CN2 and CN5 can include a LAN or the Internet or the like, for example.

The constitution of the controller 30 will be described next. The controller 30 can be constituted comprising a path adapter ('CHA' hereinbelow) 110, a disk adapter ('DKA' hereinbelow) 120, a cache memory 130, a shared memory 140, a connection control section 150, and a service processor ('SVP' hereinbelow) 160, for example.

Each CHA 110 controls the data transfer to and from each host 13 and comprises a plurality of communication ports 111. A plurality of CHA 110 can be provided in the storage control device 10. The CHAs 110 are prepared in accordance with the type of host 13 and may be an open-system server CHA, mainframe CHA, or the like, for example. Each CHA 110 receives commands requesting the reading and writing of data from the host 13 that is connected to each CHA 110 and operates in accordance with the commands received from the host 13.

A plurality of each DKA 120 can be provided in the storage control device 10. The respective DKA 120 control data communications to and from the respective disk drives 210. Each of the DKA 120 and each of the disk drives 210 are connected via a SAN or other communication network CN4, for example, and perform data transfers in block units in accordance with the Fibre Path protocol. Each of the DKA 120 monitor the states of the disk drives 210 and the monitoring results are transmitted to the SVP160 via an internal network CN3.

Further, the respective CHA 110 and DKA 120 can also be constituted as separate control circuit substrates and a CHA function and DKA function can also be provided on one control circuit substrate.

The cache memory 130 stores user data and so forth, for example. The cache memory 130 can be constituted by a nonvolatile memory, for example, but can also be constituted by a volatile memory. When the cache memory 130 is constituted by a volatile memory, the cache memory 130 is backed up by a battery section 50.

The shared memory (or control memory) 140 stores various control information for controlling the operation of the storage control device 10, and management information, and so forth. The shared memory 140 is constituted by a nonvolatile memory, for example. The control information and so forth can be multiplexed and managed by a plurality of shared memories 140.

Further, the cache memory 130 and shared memory 140 may be constituted as separate memory circuit substrates or the cache memory 130 and shared memory 140 may be mounted within one memory circuit substrate. Further, the constitution may be such that a portion of the cache memory is used as a control area for holding control information and the remaining portion of the cache memory is used as a cache area for storing data.

The connection control section 150 connects each CHA 110, each DKA 120, the cache memory 130 and the shared memory 140. As a result, all the CHA 110 and DKA 120 are capable of accessing the cache memory 130 and shared memory 140. The connection control section 150 can be constituted as a crossbar switch or the like, for example.

The SVP 160 is connected to each CHA 110 and each DKA 120 via an internal network CN3 such as a LAN or the SVP 160 can also be connected to only each CHA 110 via the communication network CN3. The SVP 160 is connected to a plurality of management terminals 14 via the communication network CN2 and collects the various states in the storage control device 10 before supplying these states to the management terminals 14. Further, the management terminal 14 or management server 15 are also capable of changing the constitution and so forth of the storage control device 10 via the SVP 160.

As mentioned earlier, the controller 30 can be constituted by mounting substrates (CHA 110, DKA120, and so forth) of a plurality of types in a controller enclosure but is not limited to such a constitution. A constitution in which each of the above-mentioned functions (the communication function for communication with the host 13, the communication function for communication with the disk drive 210, and the data processing function and so forth) are mounted on a single control substrate is also acceptable. In this case, the constitution is a redundant constitution in which a plurality of control substrates are provided, which is preferable from the perspective of improving the reliability of the storage control device 10.

The data I/O processing by the controller 30 will be described first. The CHA 110 stores a read command received from the host 13 in the shared memory 140. The DKA 120 references the shared memory 140 as occasion calls and, upon finding a read command, reads data from the disk drive 210 and stores the data in the cache memory 130. The CHA 110 reads the data copied to the cache memory 130 and transmits the data to the host 13.

Upon receipt of a write command from the host 13, the CHA110 stores the write command in the shared memory 140. The CHA110 stores the received write data (user data) in the cache memory 130. The CHA 110 reports the end of writing to the host 13 after storing the write data in the cache memory 130. The DKA120 reads the write data that is stored in the cache memory 130 in accordance with the write command stored in the shared memory 140 and stores the write data in a predetermined disk drive 210. The constitution may also be such that the CHA 110 reports the end of writing to the host 13 after the write data has been written to the disk drive 210.

Here, the user data that is stored only in the cache memory 130 is known as dirty data and the data that is stored in both the cache memory 130 and disk drive 210 is called clean data. The clean data is erasable and erased when blank areas of the cache memory 130 are lacking, for example. When any fault occurs with the power supply system of the storage control device 10, the dirty data stored in the cache memory 130 is held in the disk drives 210 within the operating time maintained by the battery section 50.

As shown in the lower part of FIG. 5, the RAID group 212 is constituted by a predetermined number of disk drives 210. The RAID group 212 constitutes a redundant storage area on the basis of the physical storage area of each disk drive 210. One or a plurality of logical storage areas (LU) 213 can be established in the physical storage areas provided in the RAID group 212. The logical storage areas 213 are known as logical volumes or logical storage devices.

FIG. 6 is an explanatory diagram showing the supply structure for each disk drive 210. Further, FIG. 6 also illustrates the relationship between the supply structure for each disk drive 210 and the logical constitution of each disk drive 210. Further, due to the conditions of the page, FIG. 6 shows only the uppermost HDD box 20 in detail and the constitution of the other HDD boxes 20 is simplified.

As mentioned earlier, for example, one supply unit 211 is constituted by eight disk drives 210, for example. DC power of predetermined voltages is supplied by each of the separate normal power supply units 230 to the respective power supply units 211. Examples of the predetermined voltage include 12 volts and 5 volts or similar but these values serve only as an example. Each of the disk drives 210 are connected in parallel via the normal paths L2 and L3 of each of the respective voltages to the normal power supply units 230. Further, one redundant power supply unit 240 supports each normal power supply unit 230 in the redundant power supply group. FIG. 6 expediently shows that only the normal power supply unit 230 on one side is supported by the redundant power supply unit 240. However, as mentioned earlier, the redundant power supply unit 240 is charged with eight normal power supply units 230.

As shown in FIG. 6, the RAID group 212 is constituted by disk drives 210 each belonging to a different power supply unit 211. Hence, data can be input and output by performing collective copying by using another disk drive 210 that constitutes the RAID group 212 even when the supply of power to any one power supply unit 211 stops. Thus, reliability is improved by constituting the RAID group 212 by collecting the disk drives 210 that belong to each of the different power supply units 211.

Figure 7:
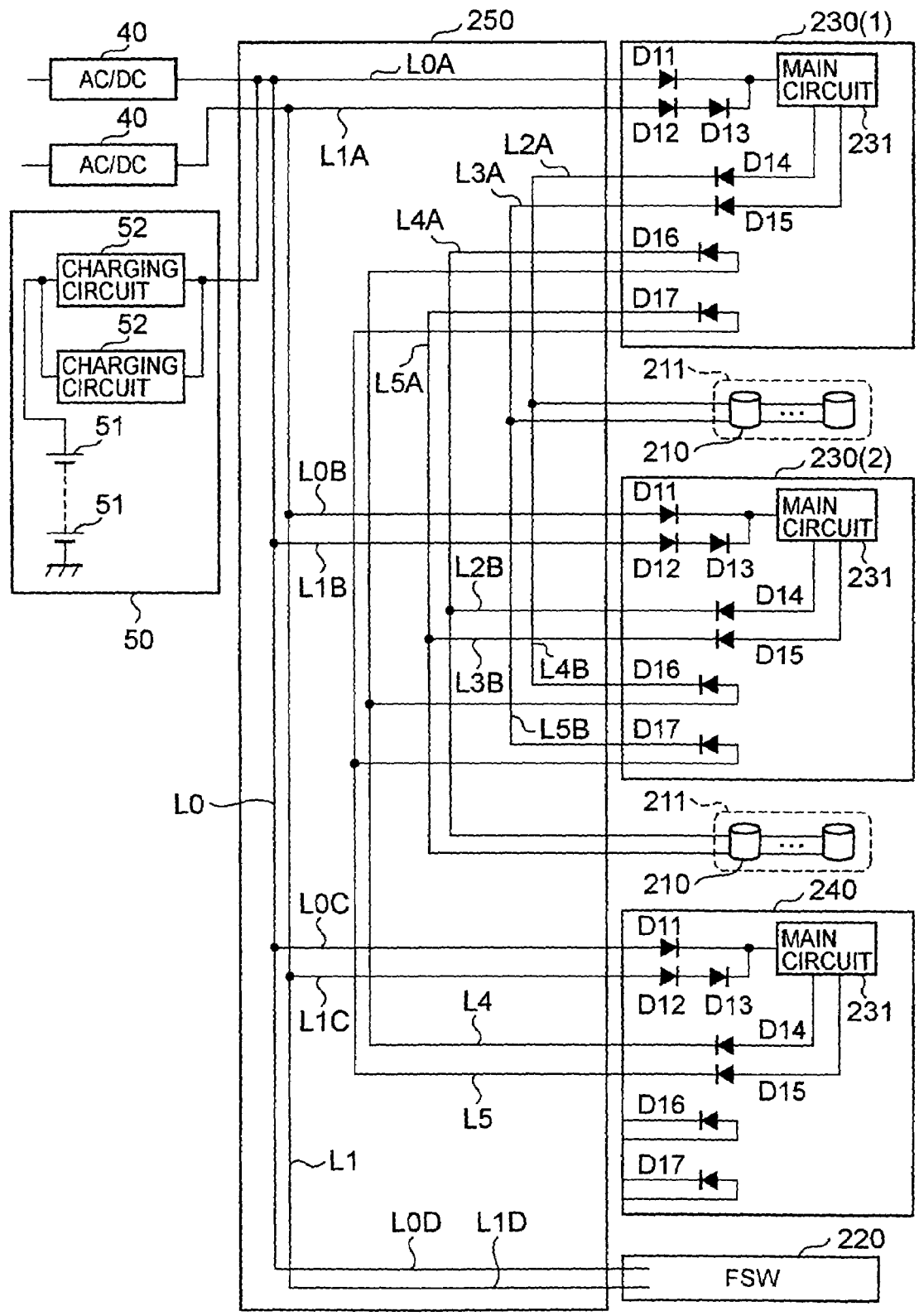
FIG. 7 is a circuit diagram showing the connection between each power supply unit and each disk drive, and so forth.

FIG. 7 is an explanatory diagram showing the details of the power supply system. In FIG. 7, due to the conditions of the description, two normal power supply units 230 and one redundant power supply unit 240 are described by way of example. In reality, eight normal power supply units 230 are supported by one redundant power supply unit 240 as mentioned earlier.

The power supply system in the HDD box 20 is constituted by AC/DC power supply units 40, the battery section 50, a plurality of normal power supply units 230, one redundant power supply unit 240, and a connection substrate 250, for example.

As already mentioned, the AC/DC power supply units 40 convert AC current that is supplied from outside the storage control device 10 into DC power with an intermediate voltage on the order of a few tens of volts and then output the DC power. Among the plurality of AC/DC power supply units 40, the upper AC/DC power supply unit 40 is the primary AC/DC power supply unit that is used in a normal state, while the lower AC/DC power supply unit 40 is used for backup purposes when the primary AC/DC power supply unit 40 stops functioning. Therefore, even when either one of the AC/DC power supply units 40 fails, an intermediate voltage can be supplied by the other AC/DC power supply unit 40.

The battery section 50 comprises a plurality of batteries 51 and a plurality of charging circuits 52. The charging circuits 52 are charged with charging each battery 51 and discharging each battery 51. Reliability is improved by rendering the charging circuits 52 redundant.

The details of the normal power supply unit 230 will be provided subsequently in conjunction with FIG. 8. However, the normal power supply unit 230 comprises a main circuit 231 and a plurality of diodes D11 to D17 and so forth, for example. The normal power supply unit 230 converts input DC power of an intermediate voltage into predetermined voltages (12 volts and 5 volts, for example) and supplies the predetermined voltages to the respective disk drives 210 constituting the power supply units 211.

Here, the diodes D11, D12 and D13 are input diodes. The diodes D11 to D13 can be provided in the main circuit 231 but are shown outside the main circuit 231 in FIG. 7 for the sake of expediency in the description. Among the plurality of input terminals that the normal power supply unit 230 comprises, only the diode D11 is connected with a forward bias to one input terminal. The plurality of diodes D12 and D13 are directly connected with a forward bias to the other input terminal.

The diodes D14 and D15 are output diodes. One diode D14 is connected to an output terminal for outputting a relatively high voltage (12 volts, for example) and the other diode D15 is connected to an output terminal for outputting a relatively low voltage (5 volts, for example).

The diodes D16 and D17 are redundant-connection diodes. One diode D16 is used to connect a redundant path to a normal path for supplying a relatively high voltage and the other diode D17 is used to connect another redundant path to a normal path for supplying a relatively low voltage. A plurality of redundant-connection terminals are provided for each of the redundant-connection diodes D16 and D17. In other words, each of the redundant-connection diodes D16 and D17 are provided for connections between one set of redundant-connection terminals. In the normal power supply unit 230, the path linking the respective redundant-connection terminals constitutes one portion of the redundant path. Because these redundant-connection diodes D16 and D17 are provided in the redundant path, there is a difference in the number of diodes between the normal path and redundant path and, as a result of this difference in the numbers of diodes, the normal path and redundant path are switched automatically and rapidly.

The redundant power supply unit 240 has the same structure as the normal power supply unit 230 and hence a description thereof is omitted here. A power supply unit connected to a normal path functions as a normal power supply unit 230 and a power supply unit connected to a redundant path functions as a redundant power supply unit 240. By establishing a common structure for the power supply units 230 and 240, the fabrication costs and management costs of the power supply units can be reduced. The constitution is not limited to such an arrangement, however, and, as in the case of the subsequently described embodiments, the structures of the normal power supply units 230 and redundant power supply unit 240 can be made different.

The connection substrate 250 is constituted as a multilayered printed wiring substrate, for example, that connects the AC/DC power supply unit 40 and battery section 50 with each of the power supply units 230 and 240. Further, the connection substrate 250 connects the power supply units 230 and 240 to the respective disk drives 210. In addition, the connection substrate 250 connects the respective normal power supply units 230 and redundant power supply unit 240.

A plurality of paths L0 to L5 are formed on the connection-substrate 250. The paths L0 and L1 are input paths for supplying DC power of an intermediate voltage to each of the power supply units 230 and 240. The input paths L0 and L1 are each connected to the input terminal of the first normal power supply unit 230 (1) via branch paths L0A and L1A. Further, the input paths L0 and L1 are connected to the input terminal of the other normal power supply unit 230 (2) via branch paths L0B and L1B. Likewise, the input paths L0 and L1 are connected to the input terminal of the redundant power supply unit 240 via the branch paths L0C and L1C. Further, the input paths L0 and L1 are connected to the input terminals of the FSW 220 via the branch paths L0C and L1C.

The paths L2A, L3A, L2B, and L3B are normal paths for supplying DC power of a predetermined voltage from the respective normal power supply units 230 to each of the disk drives 210 in the respective power supply units 211. L2A and L2B are used in order to supply a relatively high voltage and L3A and L3B are used to supply a relatively low voltage. The normal paths L2A, L3A, L2B and L3B each connect the output terminal of the normal power supply unit 230 and the input terminal of the disk drive 210. Further, when no particular distinction is made, the paths L2A, L3A, L2B, and L3B are called normal paths L2 and L3.

The paths L4 and L5 are redundant paths. One redundant path L4 is used to supply a relatively high voltage. The other redundant path L5 is used to supply a relatively low voltage. One end of each of the redundant paths L4 and L5 is connected to the output terminals of the redundant power supply unit 240. The other ends of the redundant paths L4 and L5 are connected to the redundant-connection terminals of the normal power supply unit 230.

The redundant paths L4 and L5 are connected to one redundant-connection terminal of each set of the first normal power supply unit 230(1) via the branch paths L4A and L5A. The redundant-connection diode D16 is connected within the first normal power supply unit 230 (1) to the branch path L4A. The redundant-connection diode D17 is connected within the first normal power supply unit 230 (1) to the branch path L5A. Further, the branch path L4A is connected midway along the normal path L2B that is connected to another normal power supply unit 230 (2) and the branch path L5A is connected midway along the normal path L3B that is connected to the other normal power supply unit 230 (2). Therefore, the redundant paths L4 and L5 are OR-connected to the normal paths L2B and L3B via the redundant-connection diodes D16 and D17.

Likewise, the redundant paths L4 and L5 are connected to the redundant-connection terminal of the other normal power supply unit 230 (2) via the branch paths L4B and L5B. A redundant-connection diode D16 is connected within the other normal power supply unit 230 (2) to the branch path L4B. A redundant-connection diode D17 is connected within the other normal power supply unit 230 (2) to the branch path L5B. The branch path L4B is connected midway along the normal path L2A that is connected to the first normal power supply unit 230 (1). The branch path L5B is connected midway along the normal path L3A that is connected to the first normal power supply unit 230 (1). Hence, the redundant paths L4 and L5 are OR-connected to the normal paths L2A and L3A via the redundant-connection diodes D16 and D17.

Thus, one route (L4A and L5A) of the redundant paths L4 and L5 is connected to the normal paths L2B and L3B of the other normal power supply unit 230 (2) via the diodes D16 and D17 provided within the first normal power supply unit 230 (1). Likewise, the other one route (L4B, L5B) of the redundant paths L4 and L5 are connected to the normal paths L2A and L3A of the first normal power supply unit 230 (1) via the diodes D16 and D17 in the other normal power supply unit 230 (2).

That is, the redundant paths are connected so as to intersect one another between each of the normal power supply units 230 (1) and 230 (2). As a result, even when a normal power supply unit 230 that is the destination for a redundant connection is removed from the HDD box 20 in order to be exchanged, power can be supplied to the normal path via the redundant-connection diodes D16 and D17 in a normal power supply unit 230 that is different from the normal power supply unit 230 that is to be exchanged.

Figure 8:
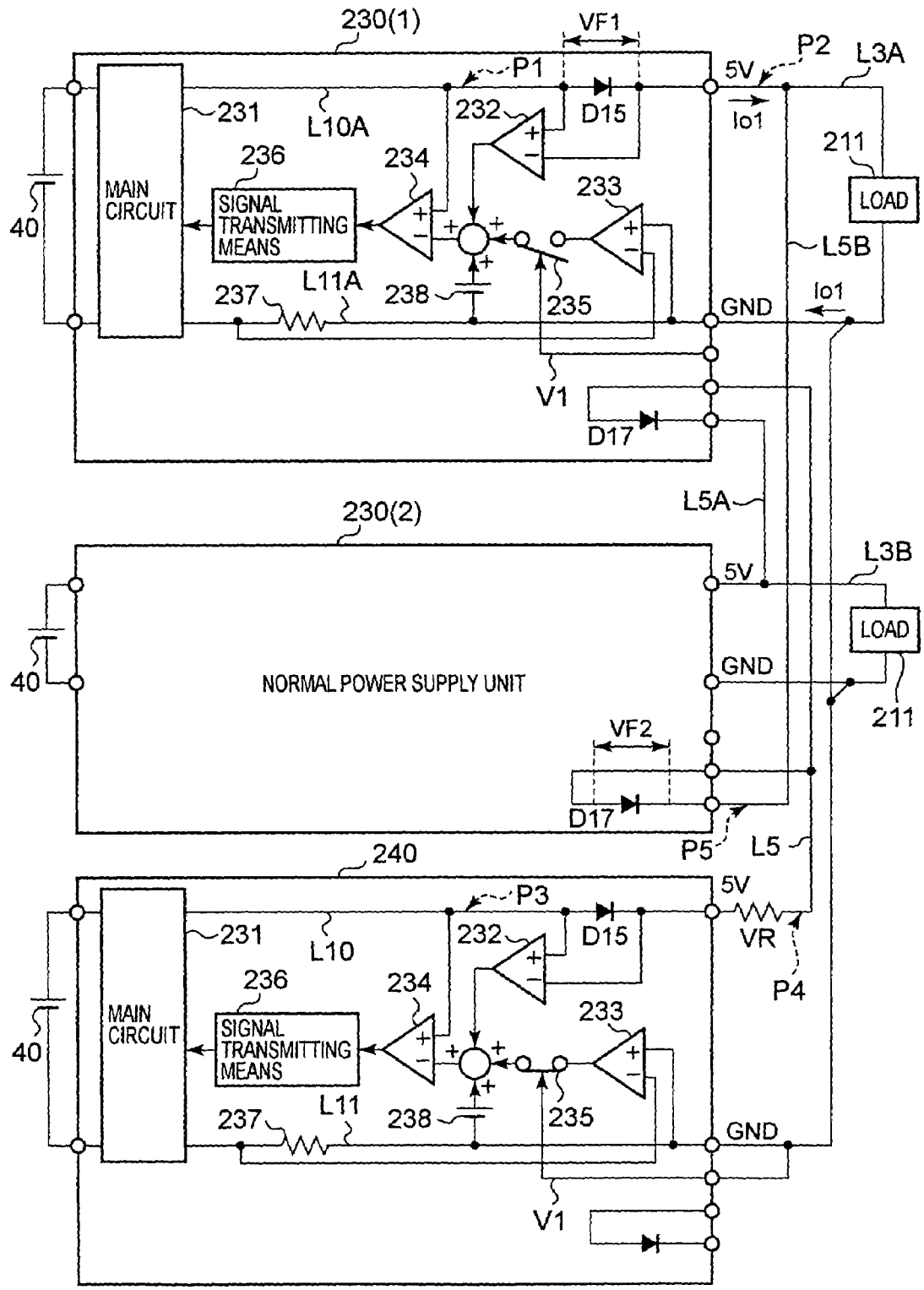
FIG. 8 is a circuit diagram showing the internal circuit of each power supply unit.

FIG. 8 is a circuit diagram showing the detailed constitution within the power supply units 230 and 240. Because the respective power supply units 230 and 240 have the same structure, the first normal power supply unit 230 (1) will be described by way of example hereinbelow. Further, FIG. 8 shows only an output circuit for a relatively low voltage output (5 volts, for example) among a plurality of DC outputs for the sake of expediency in the description. The circuit shown in FIG. 8 implements a function for correcting the output voltage.

The normal power supply unit 230 (1) comprises a main circuit 231, a first operational amplifier 232, a second operational amplifier 233, a third operational amplifier 234, a switch 235, signal transmitting means 236, a current detection resistor 237, and a reference voltage source 238, for example.

The main circuit 231 converts a DC voltage of a few volts that is input by the AC/DC power supply unit 40 into a predetermined voltage and outputs the predetermined voltage. The positive input terminal (noninverting input terminal) of the first operational amplifier 232 is connected to the anode side of the output diode D15 and the negative input terminal (inverting input terminal) of the first operational amplifier 232 is connected to the cathode side of the output diode D15. That is, the first operational amplifier 232 detects the voltage drop VF1 generated by the output diode D15 that prevents a reversal of the output current and outputs a voltage signal for correcting the voltage drop VF.

The second operational amplifier 233 detects a power output current Io1 and outputs a voltage signal for correcting a voltage drop VR produced by the redundant path. A current detection resistor 237 is provided in path L11A that joins the ground terminal (GND) and the main circuit 231. Hence, the respective input terminals of the second operational amplifier 233 are connected to the two ends of the resistor 237.

The switch 235 is provided between the inverting input terminal of the third operational amplifier 234 and the output terminal of the second operational amplifier 233. The switch 235 permits or prohibits an input to the third operational amplifier 234 of a voltage signal (VR-correction voltage signal) that is output by the second operational amplifier 233. When the switch 235 is open (when the switch is OFF), the voltage signal from the second operational amplifier 233 does not act on the third operational amplifier 234. When the switch 235 is closed (when the switch is ON), the voltage signal that is output by the second operational amplifier 233 acts on the third operational amplifier 234.

Further, the switch 235 is not provided as a hardware circuit such as a switch element or a switch circuit. Rather, the switch 235 is provided as a function for determining whether the output of the second operational amplifier 233 is used as the input to the third operational amplifier 234.

As mentioned earlier, the second operational amplifier 233 outputs a signal for correcting the voltage drop VR produced by the redundant path. Hence, because there is no need to consider the voltage signal from the second operational amplifier 233 for each of the normal power supply units 230, the switch 235 is set to the OFF state. On the other hand, in the redundant power supply unit 240, the switch 235 is set to the OFF state in order to correct the voltage drop VR.

The third operational amplifier 234 amplifies the difference between the output voltage from the main circuit 231 and a reference voltage and corrects the output voltage of the main circuit 231 by feeding back the amplified difference to the main circuit 231. The positive input terminal of the third operational amplifier 234 is located between the high-potential side of the main circuit 231 and the output diode D15 and is connected to a path L10A that joins the main circuit 231 and the output terminal.

A voltage signal that is produced by adding the voltage signal from the first operational amplifier 232 and the reference voltage from the reference voltage source 238 is input to the negative input terminal of the third operational amplifier 234. The switch 235 in the normal power supply unit 230 is set to the OFF state and, therefore, the voltage signal from the second operational amplifier 233 is not input to the third operational amplifier 234. On the other hand, because the switch 235 is set to the ON state in the redundant power supply unit 240, a voltage signal produced by adding the voltage signal from the first operating amplifier 232, the reference voltage, and the voltage signal from the second operational amplifier 233 is input to the negative input terminal of the third operational amplifier 234.

The feedback-control voltage signal that is output from the third operational amplifier 234 is input to the main circuit 231 via the signal transmitting means 236. The signal transmitting means 236 is constituted by circuit elements such as a resistor, capacitor and so forth, for example, and removes voltage-signal noise or the like.

Figure 9:
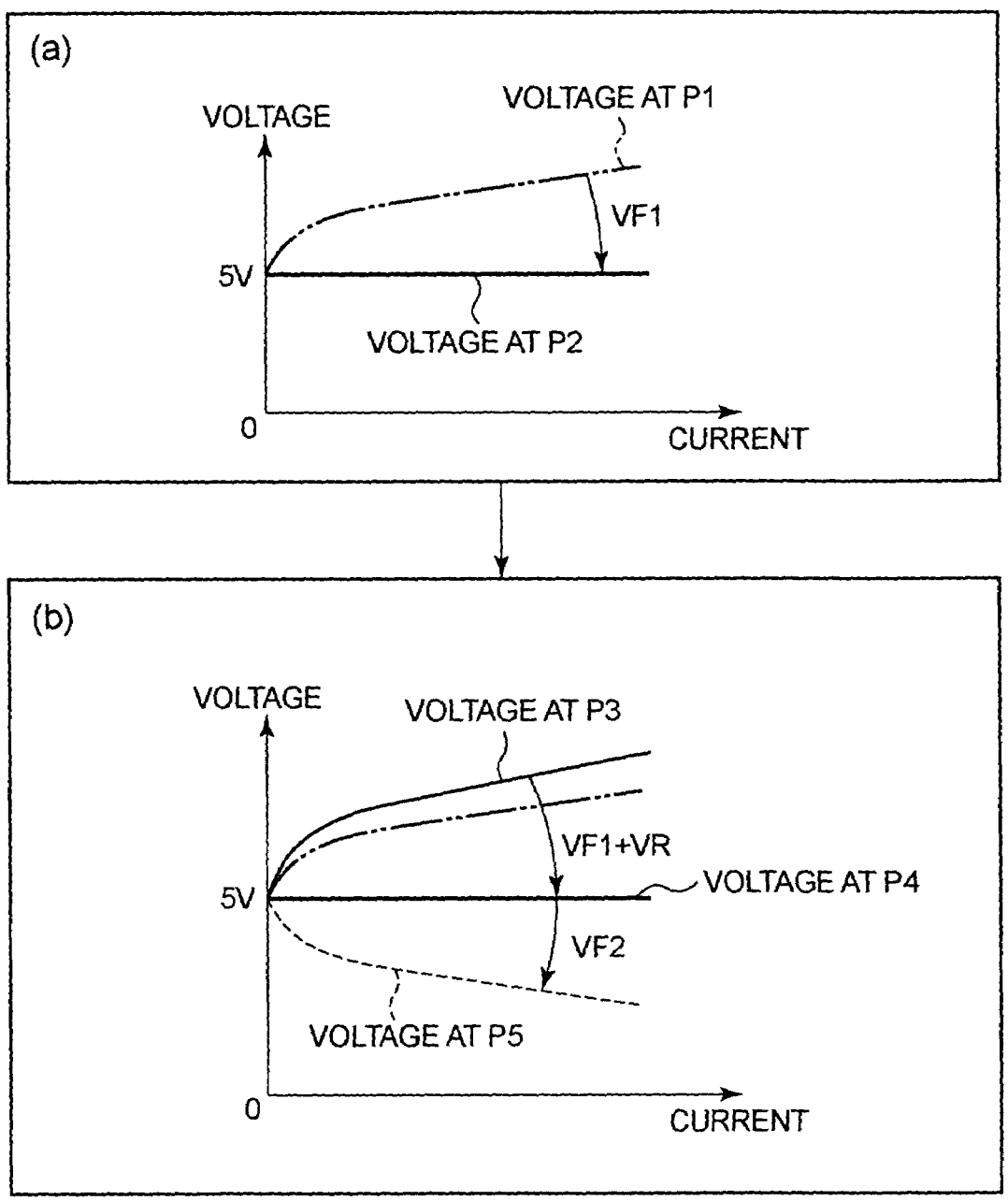
FIG. 9 is a characteristic diagram showing an aspect in which the output voltage is corrected, where

The action of the voltage correction circuit shown in FIG. 8 will now be described with reference to FIG. 9. FIG. 9A is a voltage-current characteristic diagram showing an aspect in which the output voltage of the normal power supply unit 230 is corrected. In the case of the normal power supply unit 230, because the switch 235 is set to the OFF state by a command V1 from outside the power supply unit 230, a voltage produced by adding the voltage signal from the first operating amplifier 232 and the reference voltage is input to the third operational amplifier 234.

As a result, the output voltage from the main circuit 231 (voltage at point P1 in FIG. 8) is controlled so that same rises by the voltage drop VF1 produced by the output diode D15. Therefore, the voltage that is output from the main circuit 231 via the diode D15 (voltage at point P2 in FIG. 8) is a fixed value irrespective of the value of the output current Io1. As a result, the accuracy of the power supply from the normal power supply unit 230 to each of the disk drives 210 can be improved.

FIG. 9B is a voltage-current characteristic diagram showing an aspect in which the output voltage of the redundant power supply unit 240 is corrected. In the case of the redundant power supply unit 240, because the switch 235 is set to the ON state by means of the command V1 from outside the redundant power supply unit 240, the voltage signal from the first operating amplifier 232 and the voltage signal from the second operational amplifier 233 are added to the reference voltage and input to the third operational amplifier 234.

As a result, the output voltage (voltage at point P3 in FIG. 8) of the main circuit 231 is controlled so as to rise by an amount found by adding the voltage drop VF1 across the output diode D15 and the voltage drop VR produced by the wiring resistor of the redundant path. Hence, the voltage that is output by the redundant power supply unit 240 (the voltage at point P4 in FIG. 8) is a fixed value.

When the power supply path for each disk drive 210 is switched from a normal path to a redundant path, a voltage that is reduced to the extent of the voltage drop VF2 produced by the redundant-connection diode D17 (voltage at point P5 in FIG. 8) is supplied to each of the disk drives 210.

By providing each of the power supply units 230 and 240 with such a voltage correction circuit and setting the operational mode by means of the switch 235, the accuracy of the power supply voltage can be improved while securing stable switching of the normal power supply via a normal path and the power supply during an anomaly via a redundant path.

The action of the power supply device of this embodiment will be described next. During normal times when the normal power supply unit 230 is functioning correctly, power of a predetermined voltage is supplied from the normal power supply unit 230 to each disk drive 210 in the power supply unit 211.

The redundant paths L4 and L5 are connected via the diodes D16 and D17 midway along the normal paths L2 and L3. However, the number of diodes on the normal paths (either one of D14 and D15) and the number of diodes on the redundant paths (either one of D14 and D15 and either one of D16 and D17 for a total of two) are different. Because the number of diodes provided in a redundant path is larger than the number of diodes provided in a normal path, the power supply paths are defined so that power is always supplied from the normal power supply units 230 to the power supply units 211 when the normal power supply units 230 are functioning normally.

On the other hand, when either one of the normal power supply units 230 stops functioning, power of a predetermined voltage is supplied to each disk drive 210 in the power supply unit 211 by the redundant power supply unit 240 instead of the normal power supply unit 230 that has stopped functioning. For example, when the power supply unit 211 connected to the normal power supply unit 230 that has stopped functioning is called the 'faulty power supply unit' and the normal path that is connected to the faulty power supply unit is called the 'faulty path', for example, the redundant power supply unit 240 rapidly supplies power to each disk drive 210 in the faulty power supply unit 211 via the redundant path that is OR-connected midway along the faulty path.

Further, power is subsequently supplied by the normal power supply unit 230 to each power supply unit by cutting off the redundant-connection diodes D16 and D17 even when a fault of any kind has occurred with the output terminal or redundant paths of the redundant power supply unit 240.

Because this embodiment is constituted as mentioned above, this embodiment affords the following effects. A redundant power supply constitution is implemented by allocating one redundant power supply unit 240 to a plurality of normal power supply units 230 in this embodiment. Therefore, the number of installed redundant power supply units 240 can be markedly reduced in comparison with a case where one redundant power supply unit is provided in each of the normal power supply units 230, whereby the fabrication costs of the power supply device can be reduced.

Because the normal power supply unit 230 and redundant power supply unit 240 have a common structure in this embodiment, the fabrication costs and management costs of the power supply unit can be reduced. Further, the user is not required to provide a spare unit for the normal power supply units 230 and the redundant power supply unit 240 respectively and maintainability also improves.

This embodiment is constituted such that redundant-connection diodes D16 and D17 are provided in each of the normal power supply units 230. Therefore, there is no need to provide the redundant-connection diodes D16 and D17 on the connection substrate 250 and the number of parts installed on the connection substrate 250 can be reduced and reliability can be improved. As a result, the reliability of the power supply device can be improved.

Furthermore, because the redundant-connection diodes D16 and D17 are installed in each of the normal power supply units 230, the constitution of the redundant paths L4 and L5 formed on the connection substrate 250 can be simplified. Therefore, the constitution of the connection substrate 250 can be simplified and reliability can be improved, and the fabrication costs of the connection substrate 250 can be reduced. As a result, the reliability of the power supply device can be improved and costs can be reduced.

This embodiment is constituted such that a portion of a redundant path for mutual backups with a partner is contained between the respective normal power supply units 230 that constitute a pair on the redundant power supply. That is, in other words, in the above example, the constitution is such that the redundant paths L4B and L5B and the connection-target normal paths L2A and L3A are connected via the redundant-connection diodes D16 and D17 in the normal power supply unit 230 (2) that is different from the normal power supply unit 230 (1) that is the connection target. Therefore, the faulty normal power supply unit 230 (1) can be exchanged while power is supplied from the redundant power supply unit 240 to the faulty power supply unit 211.

This embodiment is constituted such that a voltage correction circuit is contained in each of the power supply units 230 and 240. Therefore, the output voltage can be stabilized by reducing the effect of the voltage drop across the diodes D14, D15, D16 and D17, whereby the reliability of the power supply device is improved.

Second Embodiment

The second embodiment of the present invention will now be described on the basis of FIGS. 10 and 11. This embodiment corresponds to a modified example of the first embodiment. This embodiment supports the maintenance work by monitoring the power supply output of the respective power supply units 230 and 240.

Figure 10:
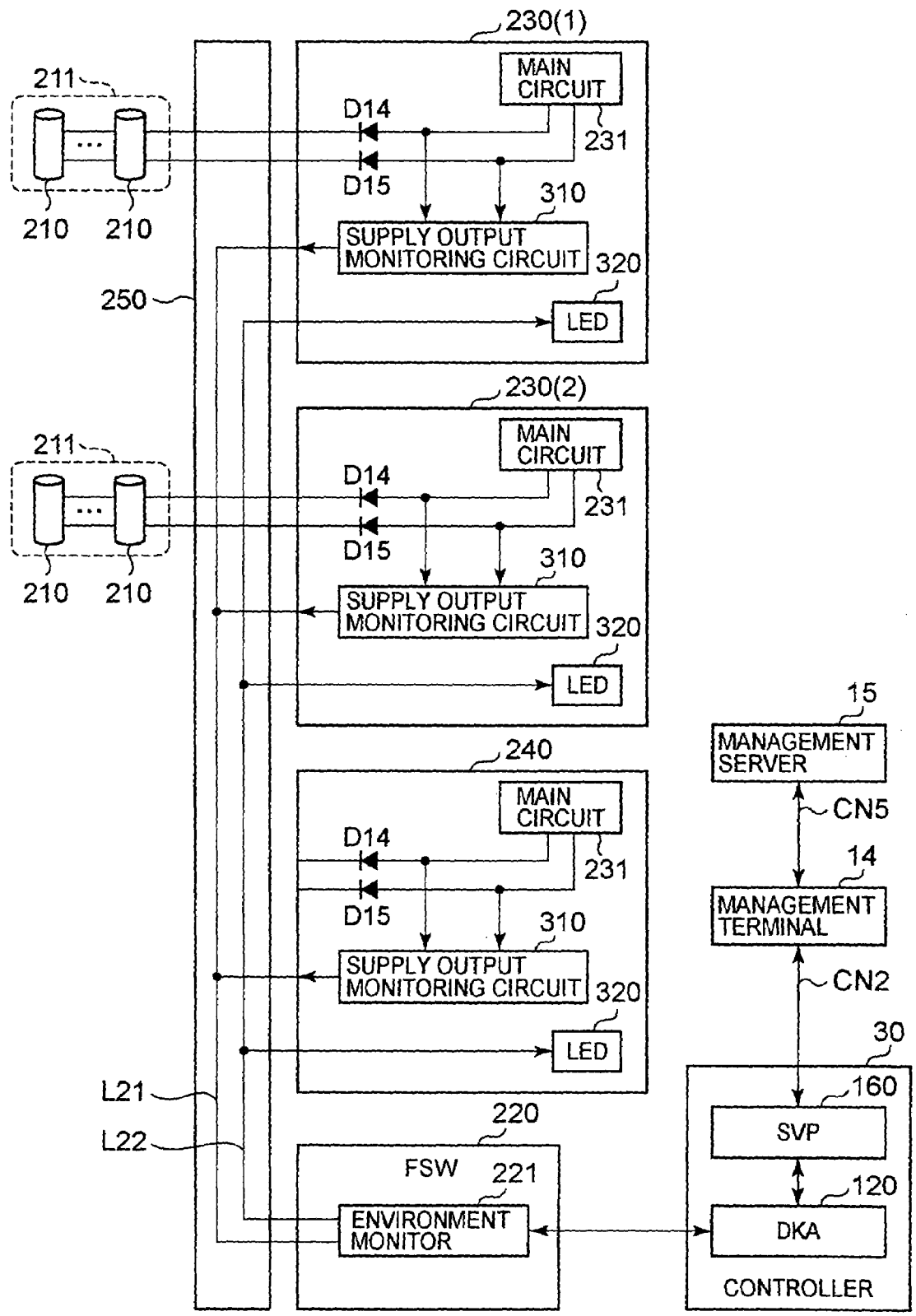
FIG. 10 is a circuit diagram showing the essential parts of a power supply device according to a second embodiment of the present invention.

FIG. 10 is a circuit diagram that shows the essential parts of the power supply device of this embodiment. The circuit shown in FIG. 10 has the same constitution as the circuit in FIG. 7 but part of the constitution is omitted for the sake of expediency. Further, a case where a diode is used as a back current prevention element will be described by way of example. However, as mentioned above, another back current prevention element such as a MOS-FET, for example, can also be used. A supply output monitoring circuit 310 and an LED lamp 320 are each provided in each of the power supply units 230 and 240.

The supply output monitoring circuit 310 monitors voltages on the anode side of the output diodes D14 and D15, for example. The monitoring circuit 310 outputs a warning signal to an environment monitor 221 in the FSW 220 when the value of the detected output voltage has reached a preset lower limit value or upper limit value.

The LED lamp 320 serves to urge a maintenance worker to exchange the unit. The LED lamp 320 light up or goes out in accordance with signals from the environment monitor 221.

The environment monitor 221 is provided in the FSW 220, for example. The environment monitor 221 is connected to the supply output monitoring circuit 310 in each of the power supply unit 230 and 240 via a monitoring signal path L21. The environment monitor 221 monitors the output state of each of the power supply units 230 and 240 and notifies the controller 30 of the monitoring result. The environment monitor 221 is also connected to the LED lamp 320 in each of the power supply units 230 and 240 via an LED control path L22. The environment monitor 221 turns off the LED lamp 320 of the power supply unit that is to be exchanged in accordance with an instruction from the controller 30.

Figure 11:
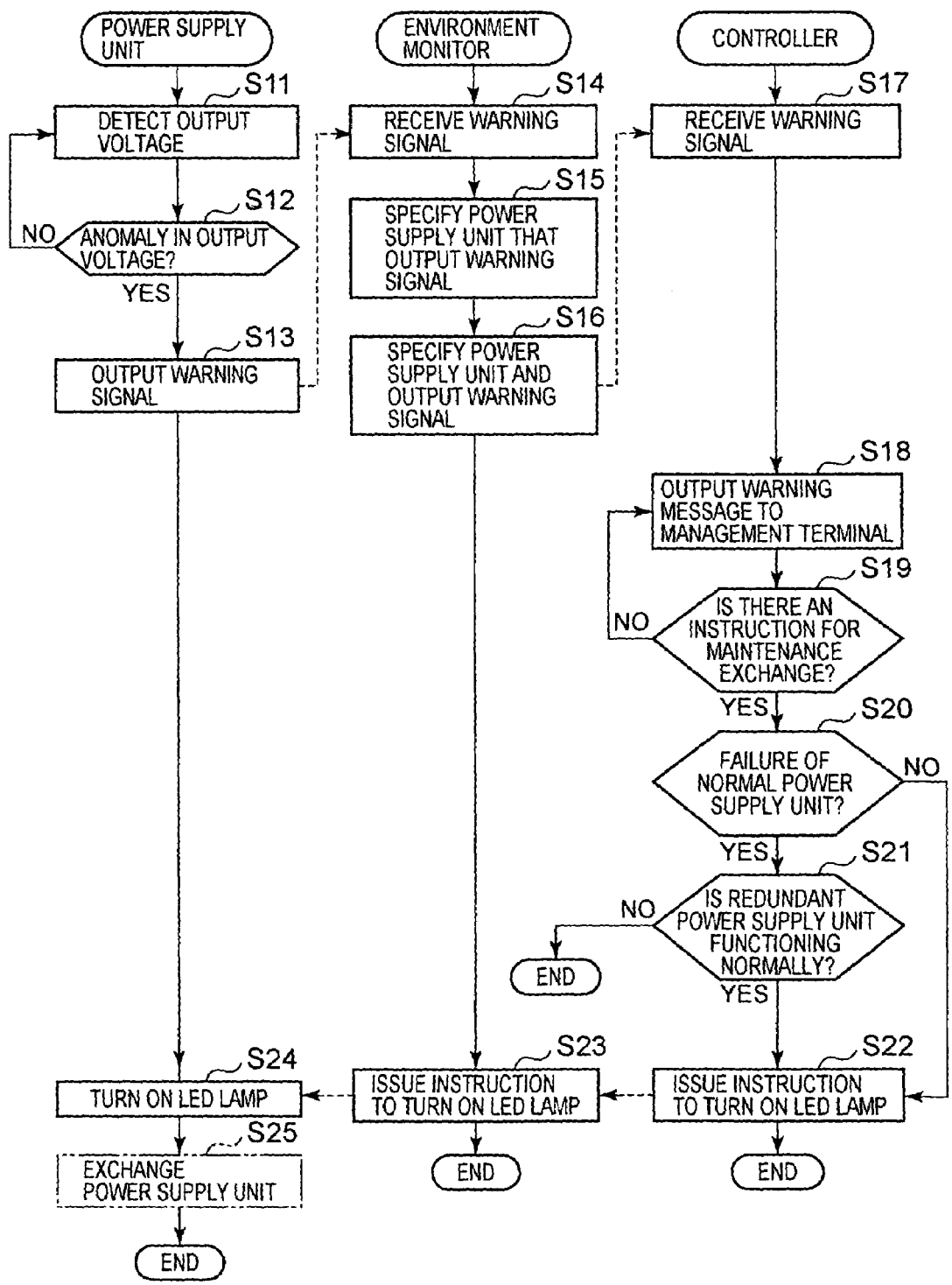
FIG. 11 is a flowchart showing processing that monitors the output voltage of each power supply unit and supports maintenance exchange work.

FIG. 11 is a flowchart showing the maintenance work support processing of the power supply unit of this embodiment. As is shown on the left side of FIG. 11, the supply output monitoring circuit 310 in each of the power supply units 230 and 240 detects the output voltage (S11) and monitors whether an anomaly has occurred (S12). When an anomaly has occurred (S12: YES), the supply output monitoring circuit 310 outputs a warning signal (S13).

Upon receipt of the warning signal from the supply output monitoring circuit 310 (S14), the environment monitor 221 specifies which power supply unit the warning signal is from (S15). For example, by including identification information for specifying the respective power supply units in the warning signal, it can be confirmed which power supply unit the warning signal was emitted by. Further, the environment monitor 221 outputs a warning signal to the outside including information specifying the power supply unit in whose voltage output the anomaly was detected (S16).

When the warning signal from the environment monitor 221 is received by the DKA120 (S17), the controller 30 outputs a predetermined warning message to the management terminal 14 via the SVP 160 (S18). The warning message includes information for specifying the type of fault detected and information for specifying the power supply unit in which the fault occurred, for example. The management terminal 14 displays a message to the effect that a fault has occurred in the power supply unit and the mount position and so forth of the power supply unit on the terminal screen.

The maintenance worker learns of the occurrence of a fault in the power supply unit as a result of checking the terminal screen of the management terminal 14. The maintenance worker instructs the controller 30 to start the procedure for maintenance exchange work via the management terminal 14 (S19: YES).

When instructed to start the procedure for maintenance exchange work, the controller 30 judges whether the fault has occurred in a normal power supply unit 230 (S20). When a fault has occurred in a normal power supply unit 230 (S20: YES), the controller 30 checks whether the redundant power supply unit 240 is functioning normally (S21). When the redundant power supply unit 240 is functioning normally (S21:YES), the controller 30 supplies an instruction to the effect that the LED lamp 320 in the normal power supply unit 230 in which the fault has occurred should be turned on to the environment monitor 221 (S22).

Upon receiving the instruction from the controller 30, the environment monitor 221 outputs a signal to the LED lamp 320 in the normal power supply unit 230 in which the fault was detected (S23) and turns on the LED lamp 320 (S24). The maintenance worker finds the power supply unit 230 whose LED lamp 320 has lit up by viewing the power supply device of the storage control device 10 from the outside. The maintenance worker removes the power supply unit 230 whose LED lamp 320 has lit up from the HDD box 20 and exchanges the power supply unit 230 for a spare power supply unit 230 (S25). Further, S25 is a step that is executed by a computer but is illustrated for the sake of understanding.

When a fault is detected in the normal power supply unit 230 (S20: YES) and when the redundant power supply unit 240 is not functioning normally (S21: NO), this processing is terminated without promoting the procedure for maintenance exchange work of the power supply unit, from a failsafe perspective.

When a fault is detected in the redundant power supply unit 240 (S20: NO), the controller 30 issues an instruction to turn ON the LED lamp 320 of the redundant power supply unit 240 (S22). As a result, the maintenance worker exchanges the redundant power supply unit 240 in which the fault was detected for a spare power supply unit (S25). As mentioned earlier, because the normal power supply unit 230 and redundant power supply unit 240 have a common structure, the spare power supply unit can also be used as the normal power supply unit 230 or as the redundant power supply unit 240.

This embodiment, which is constituted in this way, also affords operating effects similar to those of the first embodiment. In addition, this embodiment makes it possible to support the power-supply-unit maintenance exchange work and usability improves.

Third Embodiment

A third embodiment will now be described on the basis of FIG. 12. Another mode of redundant connection will be described in this embodiment. FIG. 12 is an explanatory diagram that schematically shows the mode of redundant connection with a focus on a low-voltage (5 volts) line.

FIG. 12A shows the mode of redundant connection described in the first embodiment. As shown in FIG. 12A, a redundant connection pair is constituted between two mutually adjacent normal power supply units and the redundant paths are connected intersecting one another.

The mutually adjacent normal power supply units 230 (1) and 230 (2) and the mutually adjacent normal power supply units 230 (3) and 230 (4) constitute a pair in the event of a redundant supply of power. The redundant power supply unit 240 is connected to each of the normal power supply units 230 (1) to 230 (4) via the redundant path L5.

The redundant path L5 (1) that is routed through the normal power supply unit 230 (1) is connected to the normal path L3 (2) of the paired normal power supply unit 230 (2). Conversely, the redundant path L5 (2) that is routed through the normal power supply unit 230 (2) is connected to the normal path L3 (1) of the paired normal power supply unit 230 (1). Therefore, when the normal power supply unit 230 (1) is exchanged, power is supplied via the redundant path L5 (2) from the redundant power supply unit 240 to the power supply unit 211 (1) constituting the power supply target of the normal power supply unit 230 (1).

Likewise, when the normal power supply unit (2) is exchanged, power is supplied via the redundant path L5 (1) that is routed through the normal power supply unit 230 (1) to the power supply unit 211 (2). Each of the power supply units 230 (3) and 230 (4) shown on the left side of FIG. 12 also have a similar relationship to that of the respective power supply units 230 (1) and 230 (2) above.

As shown in FIG. 12B, the redundant paths of the respective normal power supply units 230 (1) to 230 (4) are also connected in a ring shape. That is, the redundant paths of each of the normal power supply units 230 (1) to 230 (4) can be connected to the normal paths of power supply units that adjoin one another in either a counterclockwise or clockwise direction. That is, the respective normal power supply units 230 (1) to 230 (4) can form a loop-shaped topology to provide support in the event of a redundant supply of power in a predetermined direction of rotation.

The redundant path L5 (1) that is routed through the normal power supply unit 230 (1) is connected to the normal path L3 (3) of the normal power supply unit 230 (3). The redundant path L5 (3) that is routed through the normal power supply unit 230 (3) is connected to the normal path L3 (4) of the normal power supply unit 230 (4). The redundant path L5 (4) that is routed through the normal power supply unit 230 (4) is connected to the normal path L3 (2) of the normal power supply unit 230 (2). Further, the redundant path L5 (2) that is routed through the normal power supply unit 230 (2) is connected to the normal path L3 (1) of the normal power supply unit 230 (1). This embodiment, which is constituted in this manner, also affords similar effects to those of each of the embodiments above.

Fourth Embodiment

In each of the above embodiments, a case where diodes were used as the back current prevention elements was described. Several embodiments where MOS-FETs are employed as the back current prevention elements will be described next. First, the fourth embodiment of the present invention will be described on the basis of FIGS. 13 and 14.

In the earlier first embodiment, as shown in FIG. 8, the diodes D15 and D17 were used as the back current prevention elements in the power supply units 230 and 240. However, when diode power loss cannot be permitted, MOS-FETs can also be employed as the back current prevention elements.

Figure 13:
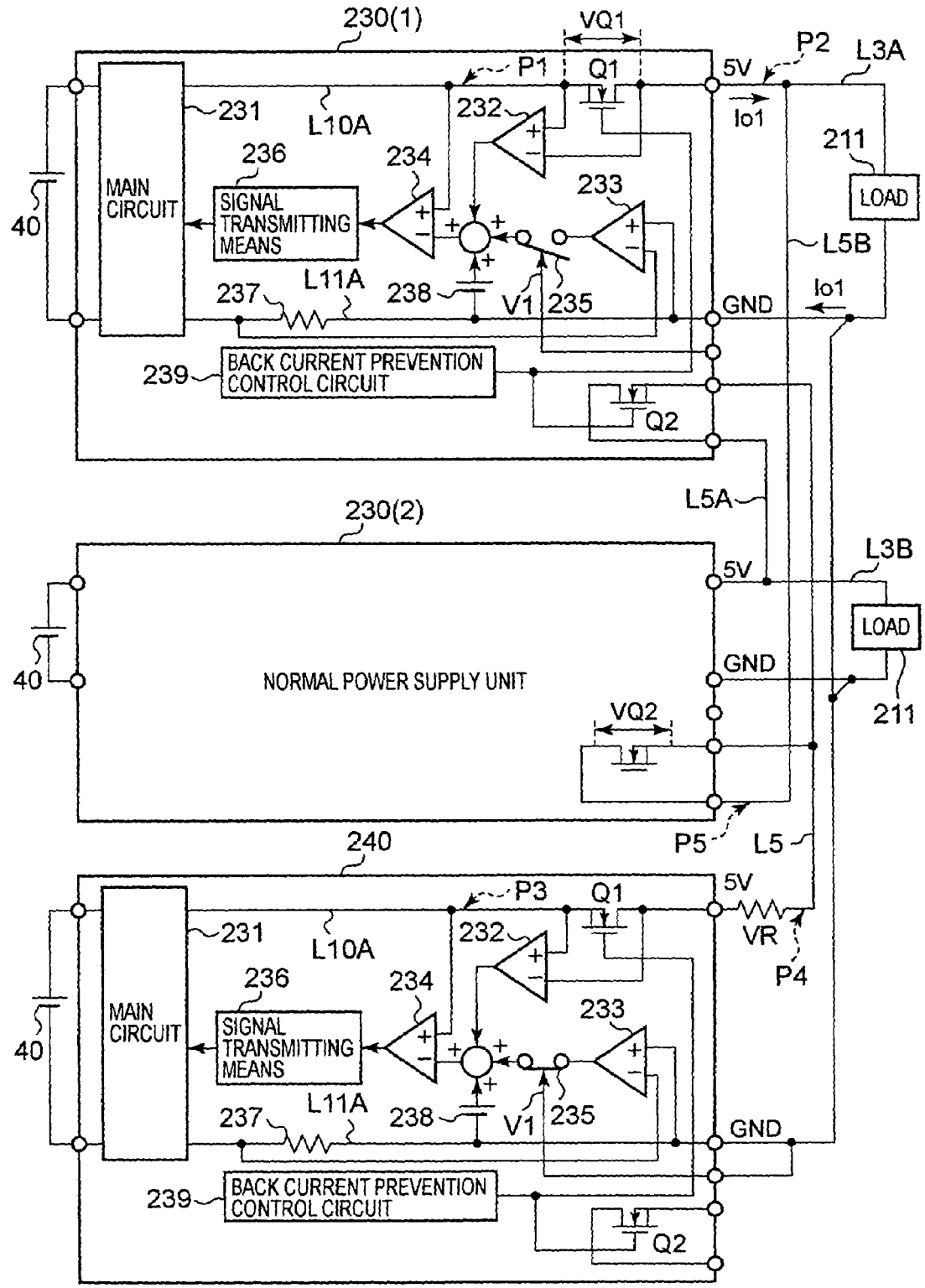
FIG. 13 is a circuit diagram of the power supply device according to a fourth embodiment of the present invention.

FIG. 13 is a circuit diagram for a case where MOS-FETs are employed as the back current prevention elements in the power supply units 230 and 240. In the circuits shown in FIG. 13, MOS-FETs Q1 and Q2 are used instead of the diodes D15 and D16. Further, a back current prevention control circuit 239 for controlling each of the MOS-FETs Q1 and Q2 is also provided in each of the power supply units 230 and 240.

The first operational amplifier 232 detects the voltage drop VQ1 produced by the back current prevention MOS-FET Q1 and outputs a voltage signal to correct this voltage drop VQ1. The second operational amplifier 232 detects the output current Io1 and outputs a voltage signal to correct the voltage drop VQ2 produced by the MOS-FET Q2. Since the remaining constitution is the same as that of the first embodiment, repetitive description is omitted here.

FIG. 14 is a voltage-current characteristic diagram showing the output voltage characteristic of this embodiment. FIG. 14A shows an aspect in which the output voltage of the normal power supply unit 230 is corrected. In the normal power supply unit 230, the switch 235 is set to an OFF state by means of the command V1 that is supplied from outside the power supply unit 230.

Therefore, the voltage produced by adding the voltage signal from the first operating amplifier 232 and the reference voltage is input to the third operational amplifier 234. As a result, the output voltage (voltage at point P1 in FIG. 13) from the main circuit 231 of each of the normal power supply units 230 is controlled to increase by the value of the output current Io1. Hence, the voltage (the voltage at point P2 in FIG. 14) that is output via the MOS-FET Q1 from the main circuit 231 is a fixed value irrespective of the value of the output current Io1. As a result, the accuracy of the supply of power from the normal power supply units 230 to the disk drives 210 can be improved.

FIG. 14B shows an aspect in which the output voltage of the redundant power supply unit 240 is corrected. In the redundant power supply unit 240, the switch 235 is set to an ON state by means of the command V1 that is supplied from outside the redundant power supply unit 240.

Therefore, the voltage signal from the first operating amplifier 232 and the voltage from the second operational amplifier 233 are added to the reference voltage and the result is input to the third operational amplifier 234. As a result, the output voltage of the main circuit 231 (the voltage at point P3 in FIG. 14) is controlled to increase by a voltage produced by adding the voltage drop VR produced by the wiring resistor of the redundant path and the voltage drop VQ1 of the MOS-FET Q1. As a result, the output voltage (the voltage at point P4 in FIG. 14) that is output by the redundant power supply unit 240 is a fixed value.

The MOS-FET Q2 is provided in the redundant power supply path for the purpose of a redundant connection. As a result of the weighting of the number of MOS-FET stages, when the normal power supply units 230 are functioning correctly, power is supplied from the normal power supply units 230 to each of the disk drives 210. However, when a normal power supply unit 230 has failed, the power supply path is automatically switched to the redundant path and power is supplied from the redundant power supply unit 240 to the target disk drive 210 via the redundant-connection MOS-FET Q2.

When the power supply path supplying power to each of the disk drives 210 is switched from the normal path to the redundant path, the voltage drop VQ2 (the voltage at point P5 in FIG. 14) produced by the redundant-connection MOS-FET Q2 is supplied to each disk drive 210.

Results similar to those in cases where diodes are used can also be obtained in cases where MOS-FETs are employed as the back current prevention elements. In addition, because this embodiment employs MOS-FETs, power loss can be reduced.

Furthermore, in this embodiment, when power is supplied to the disk drives 210 via a redundant path, the voltage drop VQ2 produced by the redundant-connection MOS-FET Q2 is kept lower than when diodes are used. Hence, the accuracy of the supply of power from the redundant power supply unit 240 to the disk drives 210 can be improved to a level exceeding the accuracy of the first embodiment.

When MOS-FETs are used as the back current prevention elements, the voltage drop VQ1 of the MOS-FET Q1 and the voltage drop VR produced by the wiring resistor of the redundant path have a linear voltage-drop characteristic as shown in FIG. 14. As a result, the correction circuit can also be further simplified by standardizing the first operating amplifier 232 and second operational amplifier 233 that output respective correction voltages.

Fifth Embodiment

A fifth embodiment of the present invention will now be described on the basis of FIGS. 15 to 17. In this embodiment, the correction circuits in the power supply units 230 and 240 are further simplified in comparison with those of the fourth embodiment that was described in conjunction with FIG. 13.

Figure 15:
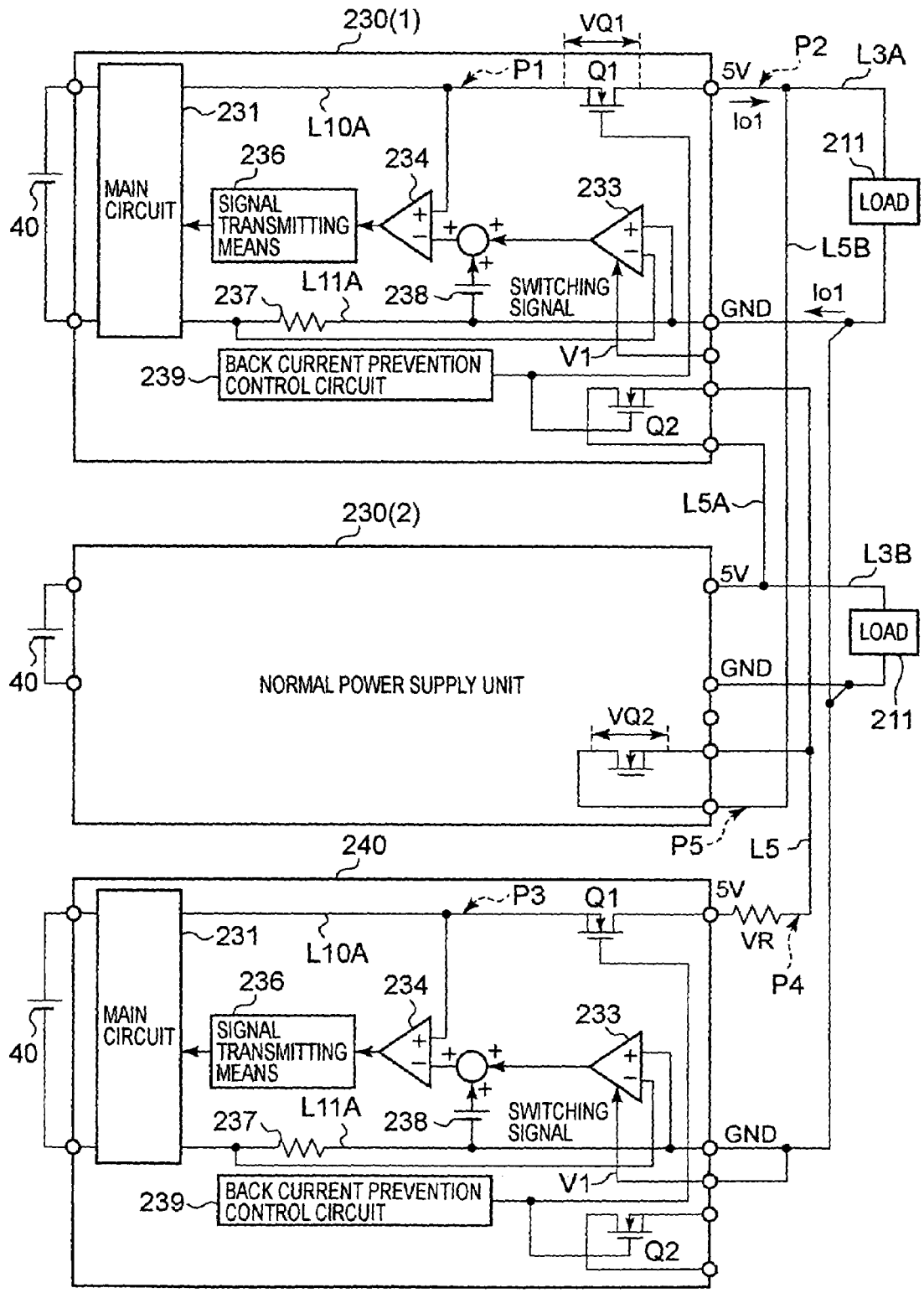
FIG. 15 is a circuit diagram of the power supply device according to a fifth embodiment of the present invention.

FIG. 15 is a circuit diagram of the embodiment. The correction circuit of this embodiment is constituted by eliminating the first operating amplifier 232 and switch 235 from the circuit constitution shown in FIG. 13 and adding the output of the second operational amplifier 233 to the reference circuit 238. The second operational amplifier 233 will be called the 'operational amplifier 233' hereinbelow.

Here, the operational amplifier 233 comprises a function to select and output a voltage signal for the purposes of a correction by means of a switching command V1 that is supplied from the outside. The operational amplifier 233 of the normal power supply unit 230 detects Io1 and outputs a voltage signal for correcting the voltage drop VQ1 produced by the MOS-FET Q1.

On the other hand, the operational amplifier 233 of the redundant power supply unit 240 outputs a voltage signal that differs from that of the operational amplifier 233 in the normal power supply unit 230 by means of a correction value switching command V1 that is supplied from the outside. That is, the operational amplifier 233 in the redundant power supply unit 240 detects Io1 and outputs a voltage signal that is rendered by adding the voltage value for correcting the voltage drop VQ1 produced by the MOS-FET Q1 to the voltage value for correcting the voltage drop VR produced by the wiring resistor of the redundant path.

As a result, the characteristics of the output voltage (voltage at point P1 in FIG. 15) of the main circuit 231 of the normal power supply unit 230 and the voltage (the voltage at point P2 in FIG. 15) that is output via the MOS-FET Q1 from the main circuit 231 are equal to those shown in FIG. 14A.

Furthermore, likewise, characteristics like those in FIG. 14B are obtained for the output voltage (the voltage at point P3 in FIG. 15) of the main circuit 231 in the redundant power supply unit 240, the voltage (the voltage at point P4 in FIG. 15) that is output by the redundant power supply unit 240, and the voltage (the voltage at point P5 in FIG. 15) that is output via the redundant-connection MOS-FET Q2.

Therefore, this embodiment allows the correction circuit to be simplified in comparison with the constitution shown in FIG. 13 and allows voltage correction effects similar to those of the constitution shown in FIG. 13 to be obtained. Hence, fabrication costs can be reduced while maintaining the same results.

Here, when the correction voltage (the voltage value for correcting the voltage drop VQ1) that is output by the operational amplifier 233 of the normal power supply unit 230 in FIG. 15 is set to zero and when the correction voltage that is output by the operational amplifier 233 of the redundant power supply unit 240 is set only to the voltage value for correcting the voltage drop VR produced by the wiring resistor of the redundant path, only the voltage drop VR produced by the wiring resistor of the redundant path is corrected. Hence, the voltage-current characteristics in this case (the voltages at points P1, P2, P3, P4, and P5 in FIG. 15) are the characteristics shown in FIG. 16.

Furthermore, when the output voltage of the operational amplifier 233 of the normal power supply unit 230 is set to the voltage value for correcting the voltage drop VQ1 and, likewise, the output voltage of the operational amplifier 233 of the redundant power supply unit 240 is set to a voltage value for correcting the voltage drop VQ1, only the voltage drop VQ1 of the MOS-FET Q1 is corrected. Therefore, the voltage-current characteristics in this case (the voltages at points P1, P2, P3, P4, and P5 in FIG. 15) are the characteristics shown in FIG. 17.

Therefore, the constitution of this embodiment that employs MOS-FETs as back current prevention elements makes it possible to simplify the correction circuit and the voltage drop produced by the back current prevention elements and the wiring drop of the redundant path can each be corrected simply by switching the settings of the operational amplifier 233 by means of the simplified correction circuit.

When MOS-FETs are used as the back current prevention elements, because the power loss of the MOS-FETs is small, cases where the voltage drop VQ1 of the MOS-FET Q1 can be allowed may also be considered. Further, when the voltage drop VR produced by the wiring resistor of the redundant path is permissible, the correction circuit can be omitted and the fabrication costs can be further reduced.

Sixth Embodiment

A sixth embodiment of the present invention will now be described on the basis of FIG. 18. In this embodiment, MOS-FETs are adopted as the back current prevention elements and the correction circuit is omitted.

Figure 18:
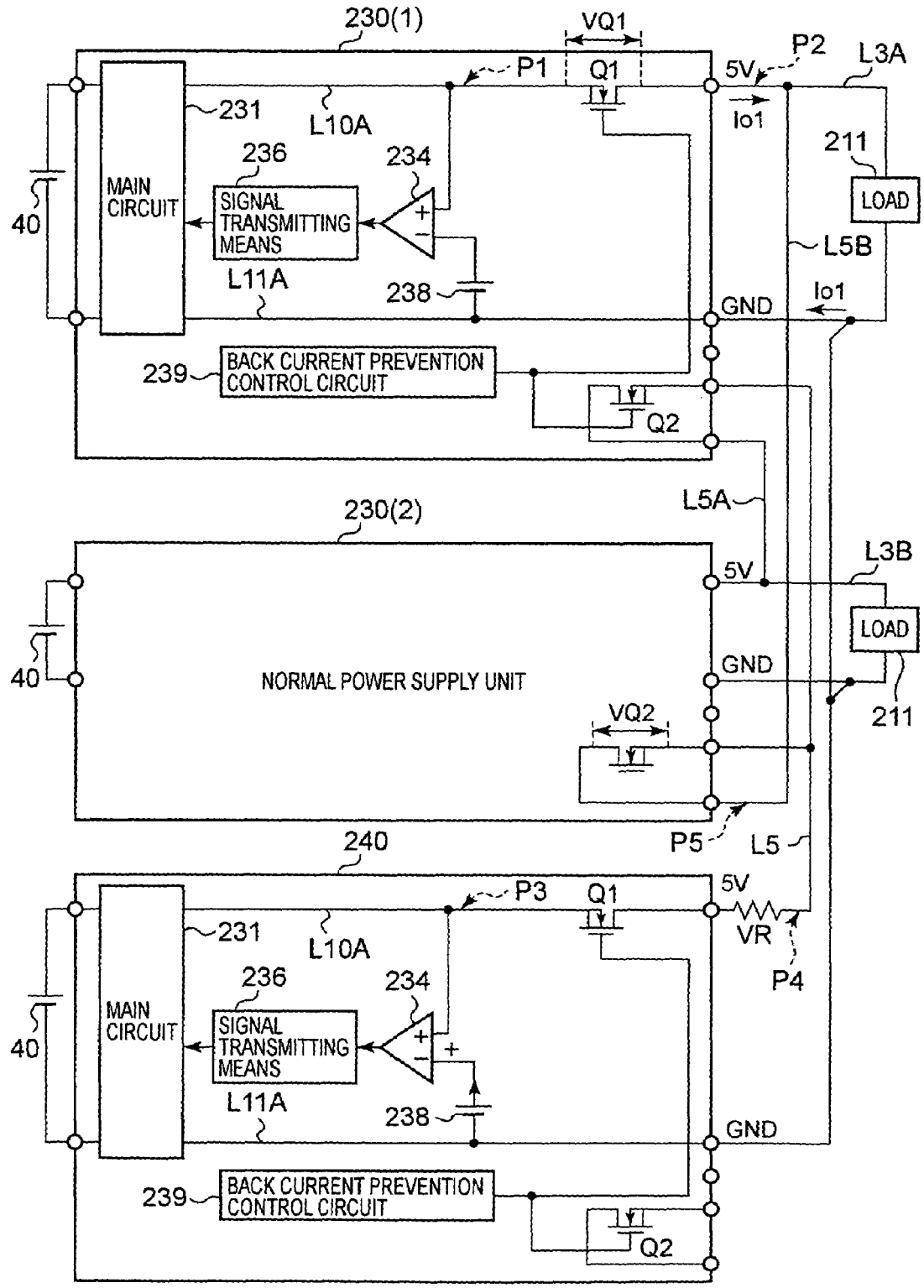
FIG. 18 is a circuit diagram of the power supply device according to a sixth embodiment of the present invention.

FIG. 18 is a circuit diagram of this embodiment. In this embodiment, the circuit for correcting the output voltage has been completely removed. As a result, in this embodiment, the voltage-current characteristics shown in FIG. 19 (the voltages at points P1, P2, P3, P4, and P5 in FIG. 15) are obtained.

Seventh Embodiment

Figure 20:
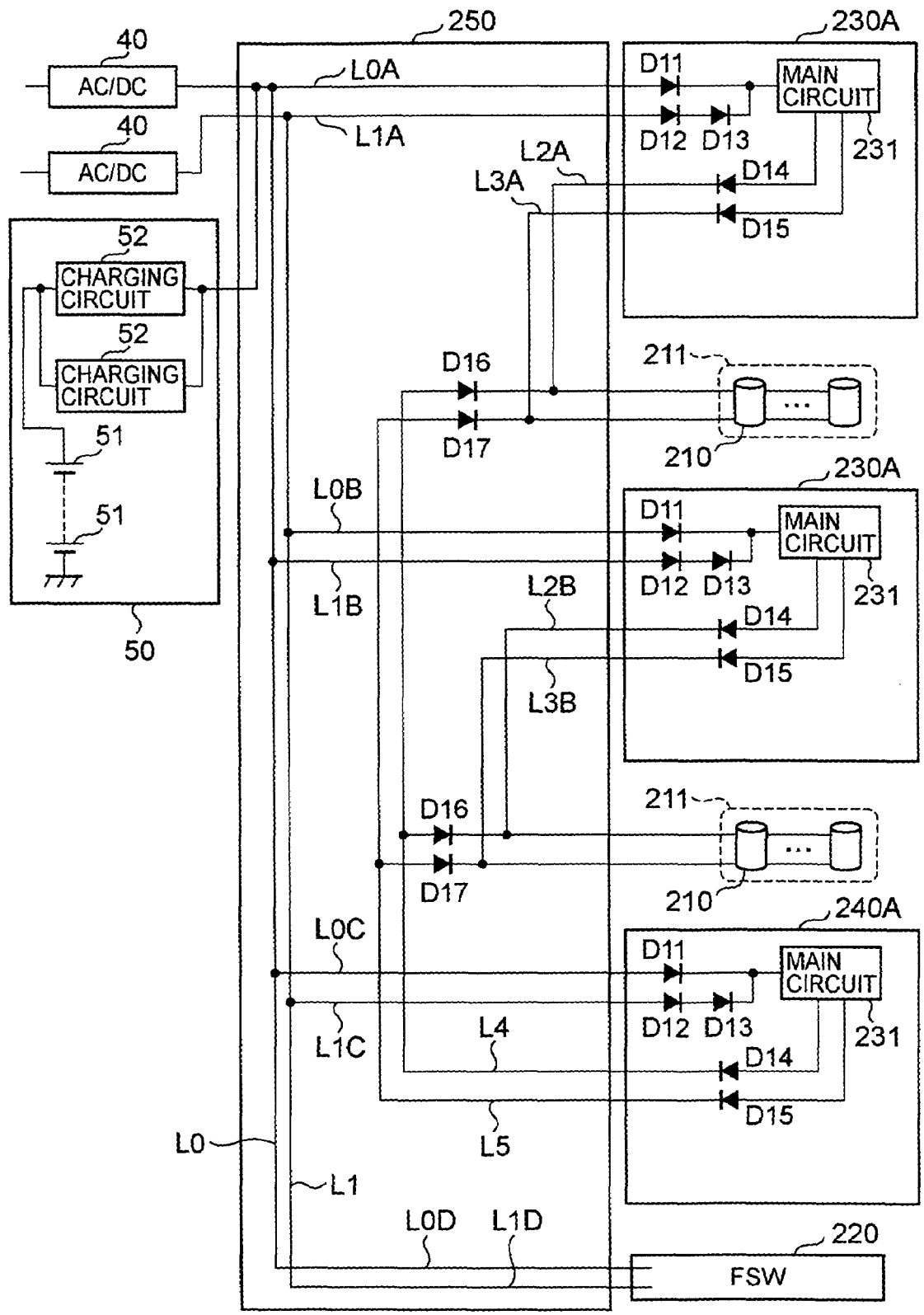
FIG. 20 is a circuit diagram showing the essential parts of a power supply device according to a first modified example.

A modified example will be described next on the basis of FIGS. 20 and 21. In the circuit diagram shown in FIG. 20, the redundant-connection diodes D16 and D17 are installed on the connection substrate 250. The normal power supply units 230A and the redundant power supply unit 240A do not contain the redundant-connection diodes D16 and D17.

In this case, the constitution of the connection substrate 250 is complex and the probability of failure is increased by the installation of the diodes D16 and D17. However, when stoppage of the function of the storage control device 10 is permitted while the connection substrate 250 is exchanged, the constitution shown in FIG. 20 can be adopted.

Figure 21:
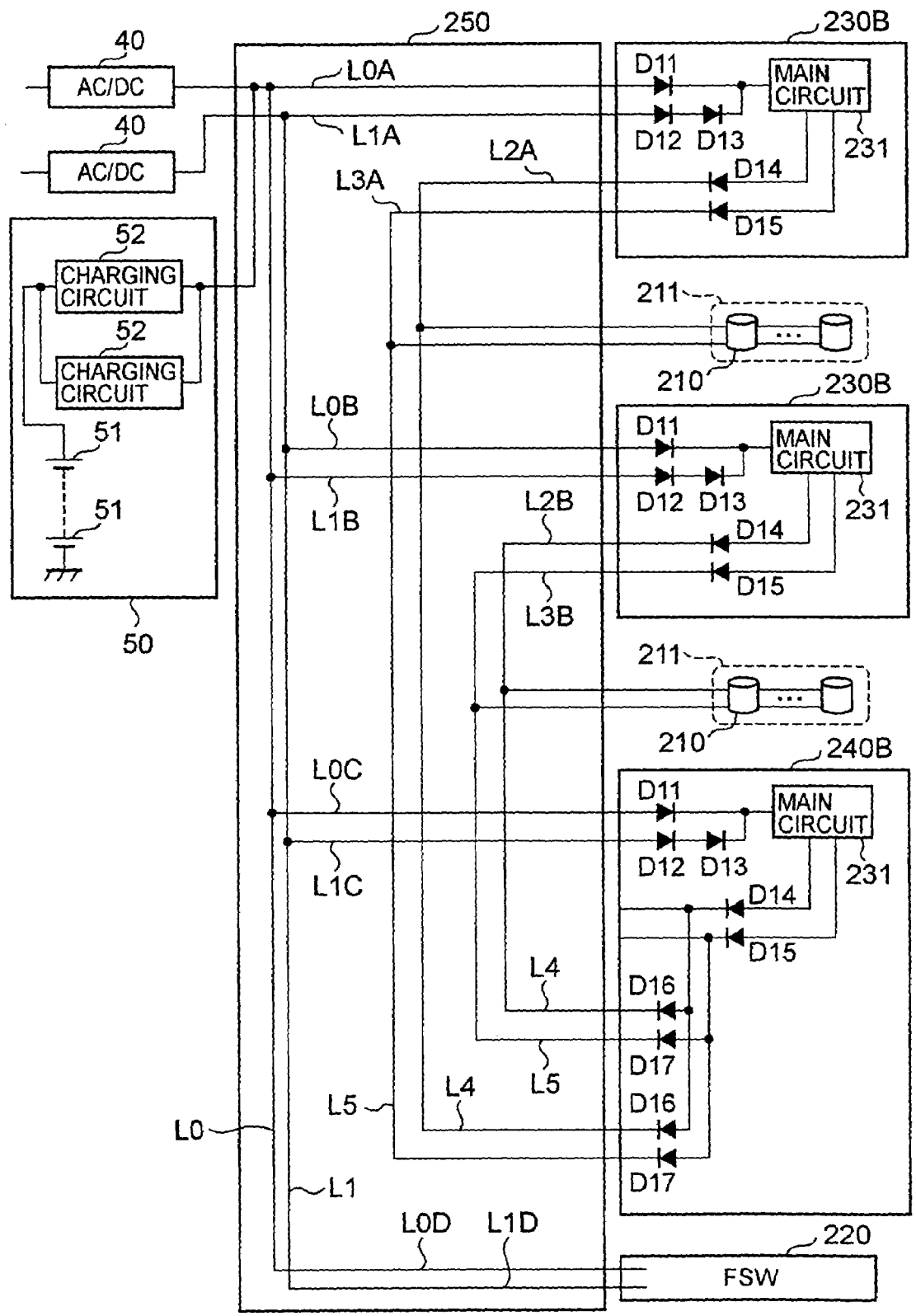
FIG. 21 is a circuit diagram showing the essential parts of a power supply device according to a second modified example.

FIG. 21 is a circuit diagram showing a second modified example. In the circuit diagram in FIG. 21, the constitutions of the normal power supply unit 230B and redundant power supply unit 240B have been changed and the redundant-connection diodes D16 and D17 are provided in the redundant power supply unit 240B.

In this case, because each of the power supply units 211 is provided with separate redundant paths L4 and L5, the constitution of the connection substrate 250 is complex and the costs thereof also increase. Further, because the redundant power supply unit 240B and each of the normal power supply units 230B are constituted as separate units, the fabrication costs and management costs increase. Moreover, separate spare units must be prepared and maintainability also drops. However, when these problems are permissible, the constitution shown in FIG. 21 can also be adopted.

Further, the present invention is not limited to the above embodiments. A person skilled in the art is able to make various additions and modifications and so forth within the scope of the present invention. Each of the embodiments can be suitably combined, for example.

What is claimed is:

1. A power supply method for supplying power to a plurality of load groups each comprising a plurality of loads, comprising the steps of:
connecting the output side of each of at least first and second power supply units, including connecting the first power supply unit to a first load group via a first path and the second power supply unit to a second load group via a second path, respectively;
connecting at least one third path to the first path of the first power supply unit so as to connect the second load group to at least one redundant power supply unit;
connecting at least one fourth path to the second path of the second power supply unit so as to connect the first load group to the at least one redundant power supply unit;
providing back current prevention elements that allow current to flow from the at least one redundant power supply unit to the load groups and prevent the flow of current in a reverse direction, midway along each of the third and fourth paths within the respective first and second power supply units;
connecting each of the back current prevention elements within each of the first and second power supply units, wherein the back current prevention element provided within the first power supply unit connects to the second path of the second power supply unit via the fourth path, and
the back current prevention element provided within the second power supply unit connects to the first path of the first power supply unit via the third path.

2. A power supply device used in a storage control device that comprises a plurality of storage devices, wherein a plurality of parity groups can each be configured by means of a plurality of the storage devices, and each of the load groups is formed by each of a plurality of the storage devices constituting the respective parity groups such that the respective storage devices belong to different load groups, comprising:
at least first and second power supply units;
at least one redundant power supply unit; and
a connection substrate for connecting each of the first and second power supply units and the redundant power supply unit to the respective load groups,
wherein the connection substrate is provided with:
a first plurality of paths including a first path having one end connected to an output side of a first power supply unit and another end connected to a first load group, and a second path having one end connected to an output side of a second power supply unit and another end connected to a second load group; and
a second plurality of paths including a third path having one end connected to the first path of the first power supply unit so as to connect to the first load group connected to the first power supply unit and another end of connected to an output side of the at least one redundant power supply unit, and a fourth path having one end connected to the second path of the second power supply unit so as to connect to the second load group connected to the second power supply unit and another end connected to the output side of the at least one redundant power supply unit; and
back current prevention elements that allow current to flow from the redundant power supply unit to the load groups and prevent the flow of current in a reverse direction, the back current prevention elements being provided midway along the third and fourth paths within the respective second and first power supply units, wherein the back current prevention elements are provided within each of the first and second power supply units such that the back current prevention elements provided within the first and second power supply units connect to the fourth and third paths, respectively.

3. A power supply device for supplying power to a plurality of load groups, each load group having a plurality of loads, the power supply device comprising:
a first exchangeable power supply unit connected to a first load group via a first path;
a second exchangeable power supply unit connected to a second load group via a second path; and
at least one redundant exchangeable power supply unit connected to the first load group via a third path, and connected to the second load group via a fourth path, wherein the third path is connected to the first path, and the fourth path is connected to the second path, wherein
each of the first and second exchangeable power supply units includes a path selection section configured to determine supplying of power to the first and second load groups, wherein
the path selection section within the first exchangeable power supply is connected between the redundant exchangeable power supply unit and the second load group via the fourth path, and is configured to supply power to the second load group when a voltage in the second path to the second load group does not have a sufficient voltage level, and
the path selection section within the second exchangeable power supply is connected between the redundant exchangeable power supply unit and the first load group via the third path, and is configured to supply power to the first load group when a voltage in the first path to the first load group does not have a sufficient voltage level.

4. The power supply device according to claim 3, wherein the path selection section within the first exchangeable power supply is provided on the fourth and connected between the redundant exchangeable power supply unit and the second load group, and
the path selection section within the second exchangeable power supply is provided on the third path and connected between the redundant exchangeable power supply unit and the first load group.

5. The power supply device according to claim 4, wherein the path selection section within the first exchangeable power supply is configured to determine the supplying of power between the second path and the fourth path, and
the path selection section within the second exchangeable power supply is configured to determine the supplying of power between the first path and the third path.

6. The power supply device according to claim 3, wherein each of the path selection sections is constituted as a back current prevention element that is provided on the third and fourth paths and located within the first and second exchangeable power supply units.

7. The power supply device according to claim 3, wherein each of the first and second exchangeable power supply units and the redundant exchangeable power supply unit are constituted having the same structure.

8. The power supply device according to claim 3, wherein each of the first and second exchangeable power supply units comprises:

a main circuit that converts electrical power that is input into a DC input and outputs DC output;

a back current prevention element that allows the DC output from the main circuit to be supplied to the first and second paths and prevents current flow in the reverse direction; and a correction circuit which detects a voltage drop that is produced by the back current prevention element, and which corrects the DC output of the main circuit to compensate for the voltage drop.

9. The power supply device according to claim 3, wherein a monitoring circuit that monitors an output voltage and outputs a warning signal when an anomaly is detected in the output voltage is provided in each of the first and second exchangeable power supply units and the redundant exchangeable power supply units.

* * * * *